(12) United States Patent
Zhao et al.

(10) Patent No.: US 11,009,910 B2
(45) Date of Patent: May 18, 2021

(54) DISPLAY METHOD AND ELECTRONIC DEVICE

(71) Applicant: HUAWEI TECHNOLOGIES CO., LTD., Shenzhen (CN)

(72) Inventors: Peng Zhao, Xi'an (CN); Xiangyang Wang, Xi'an (CN); Guangze Zhu, Xi'an (CN); Yongpan Xu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/497,900

(22) PCT Filed: May 23, 2017

(86) PCT No.: PCT/CN2017/085571
§ 371 (c)(1),
(2) Date: Sep. 26, 2019

(87) PCT Pub. No.: WO2018/176611
PCT Pub. Date: Oct. 4, 2018

(65) Prior Publication Data
US 2020/0019210 A1  Jan. 16, 2020

(30) Foreign Application Priority Data

Mar. 31, 2017 (CN) .......................... 201710208993.5

(51) Int. Cl.
*G06F 1/16* (2006.01)
*G06F 3/0354* (2013.01)
(Continued)

(52) U.S. Cl.
CPC .......... *G06F 1/163* (2013.01); *G06F 3/03547* (2013.01); *G06F 3/147* (2013.01);
(Continued)

(58) Field of Classification Search
CPC ........ G06F 1/163; G06F 3/03547; G06F 3/14; G06F 3/1423; G06F 3/147; H04B 1/385;
(Continued)

(56) References Cited

U.S. PATENT DOCUMENTS 6,081,207 A  6/2000 Batio
6,714,802 B1  3/2004 Barvesten
(Continued)

FOREIGN PATENT DOCUMENTS

CN  1375153 A  10/2002
CN  101930333 A  12/2010
(Continued)

*Primary Examiner* — Kwin Xie
(74) *Attorney, Agent, or Firm* — Maier & Maier, PLLC

(57) ABSTRACT

A display method and device, related to the field of electronic terminals. The electronic device includes a first display and a second display. The first display and the second display jointly display first display content if the first display is disposed on the electronic device; or the first display and the second display separately display content if the first display is not disposed on the electronic device, where the first display displays second display content, the second display content is related to first display content, and the second display displays third display content. The first display may be detachable, and the second display may be non-detachable. Embodiments are applied to scenarios in which displays of the electronic device jointly and separately display content, to improve display utilization of the electronic device or display flexibility, optimize a display function and/or an interaction function of the electronic device, and improve user experience.

14 Claims, 25 Drawing Sheets

(51) Int. Cl.
  *G06F 3/14* (2006.01)
  *H04B 1/3827* (2015.01)
  *H04M 1/02* (2006.01)
  *H04M 1/72412* (2021.01)
  *G06F 3/147* (2006.01)

(52) U.S. Cl.
  CPC .......... *H04B 1/385* (2013.01); *H04M 1/0254* (2013.01); *H04M 1/72412* (2021.01); *H04B 2001/3861* (2013.01); *H04M 2250/12* (2013.01)

(58) Field of Classification Search
  CPC ........ H04B 2001/3861; H04M 1/0254; H04M 1/7253; H04M 2250/12; G09G 2340/145
  See application file for complete search history.

(56) References Cited

U.S. PATENT DOCUMENTS

| | | | |
|---|---|---|---|
| 6,888,522 | B1 | 5/2005 | Shibata et al. |
| 9,610,476 | B1* | 4/2017 | Tran ................... A63B 24/0075 |
| 9,746,941 | B2 | 8/2017 | Raffa et al. |
| 2004/0102931 | A1* | 5/2004 | Ellis ...................... H04W 4/024 |
| | | | 702/188 |
| 2010/0141689 | A1 | 6/2010 | Johnson |
| 2012/0072620 | A1* | 3/2012 | Jeong ..................... G09G 5/006 |
| | | | 710/29 |
| 2013/0222271 | A1* | 8/2013 | Alberth ............. H04W 52/0267 |
| | | | 345/173 |
| 2014/0002327 | A1 | 1/2014 | Toren et al. |
| 2014/0142788 | A1 | 5/2014 | Denton |
| 2014/0184516 | A1* | 7/2014 | Kim ...................... G06F 3/0416 |
| | | | 345/169 |
| 2014/0191926 | A1 | 7/2014 | Mathew et al. |
| 2014/0239065 | A1 | 8/2014 | Zhou et al. |
| 2015/0185839 | A1 | 7/2015 | Magi et al. |
| 2015/0185874 | A1 | 7/2015 | Raffa et al. |
| 2015/0373480 | A1 | 12/2015 | Park |
| 2016/0037672 | A1 | 2/2016 | Zhang et al. |
| 2016/0364092 | A1 | 12/2016 | Lan |

FOREIGN PATENT DOCUMENTS

| | | |
|---|---|---|
| CN | 203055189 U | 7/2013 |
| CN | 103716428 A | 4/2014 |
| CN | 203849728 U | 9/2014 |
| CN | 203984432 U | 12/2014 |
| CN | 104333619 A | 2/2015 |
| CN | 104657100 A | 5/2015 |
| CN | 105988564 A | 10/2016 |
| CN | 106020757 A | 10/2016 |
| CN | 205899261 U | 1/2017 |
| JP | 2010-186131 A | 8/2010 |
| WO | 2015/085586 A1 | 6/2015 |
| WO | 2016/146652 A1 | 9/2016 |

\* cited by examiner

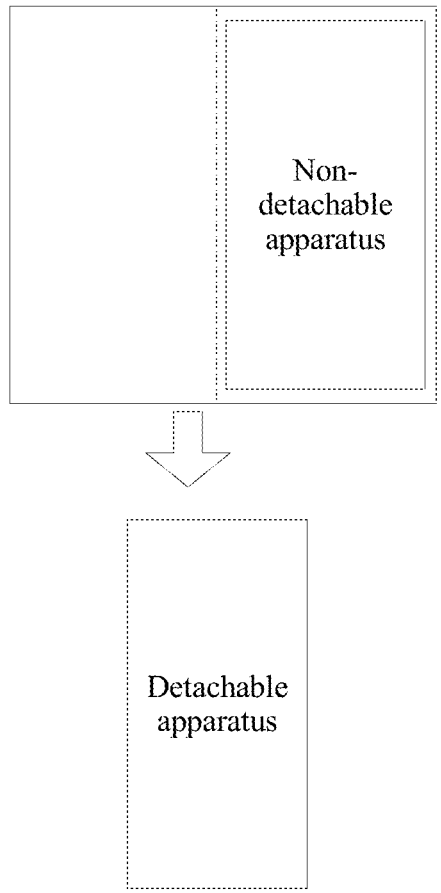

FIG. 3a

S401. A first display apparatus and a second display apparatus jointly display first display content if the first display apparatus is disposed on an electronic device S402. A first display apparatus and a second display apparatus separately perform displaying if the first display apparatus is not disposed on an electronic device, where the first display apparatus displays second display content, the second display content is related to first display content, and the second display apparatus displays third display content

FIG. 4

DISPLAY METHOD AND ELECTRONIC DEVICE

FIELD

Embodiments relate to the field of electronic terminals, and in particular, to a display method and an electronic device.

BACKGROUND

Currently, wearable electronic devices are widely used, and an existing wearable electronic device generally provides a screen as a window of interaction between a user and the electronic device.

Because of limitations on the shape of the wearable electronic device, the display screen of the wearable device is usually relatively small. Viewing display content or interacting through touching by a user on the display screen may not be as convenient as that performed on a mobile phone, tablet computer, or the like. For example, because the screen is small, a displayed icon or key of the wearable electronic device may be small. Consequently, an accidental touch may often occur when the user performs a touch. It is also inconvenient for the user to manually enter content, for example, dialing or entering context information, using the display screen of the wearable electronic device. If the user intends to share information such as a two-dimensional code using the screen of the wearable electronic device, the information may not be easily identified because of the small screen, resulting in a sharing difficulty. Therefore, an improvement in display utilization or display flexibility based on the shape of the wearable electronic device, and further optimization of a display function and/or an interaction function of a wearable device to improve operation experience of the user is an urgent requirement to be met.

SUMMARY

Embodiments provide a display method and an electronic device, to improve display utilization of the electronic device or display flexibility, optimize a display function and/or an interaction function of the electronic device, and improve operation experience of a user. The display method provided in the embodiments is not only applicable to a wearable device, but also is applicable to another terminal for improving display utilization or display flexibility. This is not limited in the embodiments.

According to an aspect, a display method applied to an electronic device is provided. The electronic device includes a first display apparatus and a second display apparatus, and the method includes: jointly displaying, by the first display apparatus and the second display apparatus, first display content if the first display apparatus is disposed on the electronic device; or separately displaying, by the first display apparatus and the second display apparatus, content if the first display apparatus is not disposed on the electronic device, where the first display apparatus displays second display content, the second display content is related to first display content, and the second display apparatus displays third display content. In other words, display content of the first display apparatus and display content of the second display apparatus constitute complete content displaying if the first display apparatus is disposed on the electronic device. For example, before the first display apparatus is inserted into the electronic device, the display content of the first display apparatus and the display content of the second display apparatus are shown in FIG. 6. When the first display apparatus is inserted into the electronic device, the display content of the first display apparatus and the display content of the second display apparatus are shown in FIG. 5. The display content of the first display apparatus may be independent of the display content of the second display apparatus if the first display apparatus is not disposed on the electronic device. In this way, the first display apparatus and the second display apparatus may jointly display the first display content, or may respectively display the second display content and the third display content, to improve display utilization of the electronic device or display flexibility, optimize a display function and/or an interaction function of the electronic device, and improve operation experience of a user.

In a possible embodiment, the second display content is related to first display content, and the second display content includes all or a part of the first display content. The second display content includes all of the first display content, and the second display content includes all display objects in the first display content. For example, the second display content may be display content obtained after uniform scaling is performed on the first display content.

In a possible embodiment, the jointly displaying, by the first display apparatus and the second display apparatus, first display content includes: displaying, by the first display apparatus, partial content of the first display content, and sending remaining content of the first display content to the second display apparatus, so that the second display apparatus displays the remaining content of the first display content. For example, when the first display apparatus and the second display apparatus jointly display content, such as the words "Hi, there", the first display apparatus may display content, such as the word "Hi," and send "there" to the second display apparatus, so that the second display apparatus may display the word "there".

In a possible embodiment, the third display content displayed on the second display apparatus is preset display content or display content related to the first display content. For example, the second display apparatus may display a preset picture.

In a possible embodiment, the method further includes: receiving, by the electronic device, a first operation instruction entered by a user, where the first operation instruction indicates that the first display apparatus is a primary control apparatus and the second display apparatus is a secondary apparatus; or receiving a second operation instruction entered by a user, where the second operation instruction indicates that the first display apparatus is a secondary apparatus and the second display apparatus is a primary control apparatus. When the first display apparatus is used as a primary control apparatus and the second display apparatus is used as a secondary apparatus, the second display apparatus cannot communicate with the electronic device if the first display apparatus is not inserted into the electronic device. If the first display apparatus detects that the first display apparatus is inserted into the electronic device, the first display apparatus may send, to the second display apparatus, display content to be displayed by the second display apparatus. In other words, the first display apparatus controls displaying of the second display apparatus. The first display apparatus may further set a parameter of the electronic device based on a setting parameter received from another electronic device. The other electronic device herein is an electronic device that can communicate with the first display apparatus. When the second display apparatus is used as a primary control apparatus and the first display apparatus is used as a secondary apparatus, if the second display apparatus detects that the first display apparatus is inserted into the electronic device, the second display apparatus may send, to the first display apparatus, display content to be displayed by the first display apparatus. In addition, the electronic device may further receive another instruction entered by the user, to set a display configuration, a startup configuration, or the like of the electronic device.

In a possible embodiment, the electronic device is connected to another electronic device, and the method further includes: receiving, by the electronic device, a first setting message sent by the user using the other electronic device, where the first setting message indicates that the first display apparatus is a primary control apparatus and the second display apparatus is a secondary apparatus; or may include receiving a second setting message sent by the user using the other electronic device, where the second setting message indicates that the first display apparatus is a secondary apparatus. In addition, the electronic device may further receive another message sent by the user using the other electronic device, to set a display configuration, a startup configuration, or the like.

In a possible embodiment, the first display apparatus is a primary control apparatus, and the method is further configured such that the second display apparatus cannot communicate with the electronic device if the first display apparatus is not disposed on the electronic device.

In a possible embodiment, the material of the first display apparatus is different from that of the second display apparatus. For example, a relatively high precision display material may be used for the first display apparatus, and a relatively low precision display material may be used for the second display apparatus. Regardless of display materials used for the first display apparatus and the second display apparatus, the first display apparatus and the second display apparatus can jointly display content without being affected.

In a possible embodiment, the first display apparatus is detachable, and the second display apparatus is detachable or non-detachable. Alternatively, the first display apparatus may be detachable or non-detachable, and the second display apparatus may be detachable. After the first display apparatus is removed from the electronic device, the first display apparatus may run as an independent device. For example, the first display apparatus may be used as an independent device such as a Bluetooth headset, an electronic thermometer, an electronic sphygmomanometer, or a recording pen. The Bluetooth headset may be configured to answer a call after being connected to another device. The electronic thermometer may be configured to measure an ambient temperature or a human body temperature. The electronic thermometer may also be configured to connect to another device, and send measurement data to another electronic device. The electronic sphygmomanometer may be configured to measure human blood pressure, and may send measurement data to another electronic device. The recording pen may be configured to record voice data and may send the voice data to another electronic device.

In a possible embodiment, the second display apparatus is a non-detachable apparatus, the electronic device further includes a third display apparatus, and the method includes: jointly displaying, by the first display apparatus, the second display apparatus, and the third display apparatus, content if the first display apparatus and the third display apparatus are disposed on the electronic device; or separately displaying, by the first display apparatus, the second display apparatus, and the third display apparatus, content if the first display apparatus or the third display apparatus is not disposed on the electronic device. In addition, when the first display apparatus and the third display apparatus are not disposed on the electronic device, the first display apparatus may be connected to the second display apparatus, or the first display apparatus and the second display apparatus may be separately connected to another electronic device, and receive a message sent by the other electronic device.

In a possible embodiment, the method may be further configured such that the first display apparatus is capable of charging the second display apparatus, or the second display apparatus is capable of charging the first display apparatus.

According to another aspect, an electronic device is provided. The electronic device includes a first display module and a second display module. The first display module and the second display module jointly display first display content if the first display module is disposed on the electronic device. Alternatively, the first display module and the second display module separately display content if the first display module is not disposed on the electronic device, where the first display module displays second display content, the second display content is related to first display content, and the second display module displays third display content. In other words, display content of the first display module and display content of the second display module constitute complete content displaying if the first display module is disposed on the electronic device. For example, before the first display module is inserted into the electronic device, the display content of the first display module and the display content of the second display module are shown in FIG. 6. When the first display module is inserted into the electronic device, the display content of the first display module and the display content of the second display module are shown in FIG. 5. The display content of the first display module may be independent of the display content of the second display module if the first display module is not disposed on the electronic device. In this way, the first display module and the second display module may jointly display the first display content, or may respectively display the second display content and the third display content, to improve display utilization of the electronic device or display flexibility, optimize a display function and/or an interaction function of the electronic device, and improve the operation experience of a user.

In a possible embodiment, the second display content is related to first display content and the second display content includes all or a part of the first display content. The second display content includes all of the first display content, and the second display content includes all display objects in the first display content. For example, the second display content may be display content obtained after uniform scaling is performed on the first display content.

In a possible embodiment, the first display module includes a first display unit, and the first display unit is configured to display partial content of the first display content; and the first display module further includes a first communications unit, and the first communications unit is configured to send remaining content of the first display content to the second display module, so that the second display module displays the remaining content of the first display content. For example, when the first display module and the second display module jointly display content, such as the words "You there?", the first display module may display the word "You", and send "there?" to the second display module, so that the second display module may display the word "there?".

In a possible embodiment, the third display content displayed on the second display module is preset display content or display content related to the first display content. For example, the second display module may display a preset picture, or may display a part or all of the first display content.

In a possible embodiment, the first display module further includes a first input/output unit, and the first input/output unit is configured to: receive a first operation instruction entered by a user, where the first operation instruction indicates that the first display module is a primary control module and the second display module is a secondary module; or receive a second operation instruction entered by a user, where the second operation instruction indicates that the first display module is a secondary module and the second display module is a primary control module. When the first display module is used as a primary control module and the second display module is used as a secondary module, the second display module cannot communicate with the electronic device if the first display module is not inserted into the electronic device. If the first display module detects that the first display module is inserted into the electronic device, the first display module may send, to the second display module, display content to be displayed by the second display module. In other words, the first display module controls displaying of the second display module. The first display module may further set a parameter of the second display module based on a setting parameter received from another electronic device. When the second display module is used as a primary control module and the first display module is used as a secondary module, if the second display module detects that the first display module is inserted into the electronic device, the second display module may send, to the first display module, display content to be displayed by the first display module, and may further set a parameter of the first display module based on a setting parameter received from another electronic device. In addition, the electronic device may further receive another instruction entered by the user, to set a display configuration, a startup configuration, or the like of the electronic device.

In a possible embodiment, the electronic device is connected to another electronic device, and the first communications unit is further configured to: receive a first setting message sent by the user using the other electronic device, where the first setting message indicates that the first display module is a primary control module and the second display module is a secondary module; or receive a second setting message sent by the user using the other electronic device, where the second setting message indicates that the first display module is a secondary module. In addition, the electronic device may further receive another message sent by the user using the other electronic device, to set a display configuration, a startup configuration, or the like of the electronic device.

In a possible embodiment, the second display module cannot communicate with the electronic device if the first display module is not disposed on the electronic device.

In a possible embodiment, the material of the first display module is different from that of the second display module. For example, a relatively high precision display material may be used for the first display module, and a relatively low precision display material may be used for the second display module. Regardless of display materials used for the first display module and the second display module, the first display module and the second display module can jointly display without being affected.

In a possible embodiment, the first display module is detachable, and the second display module is detachable or non-detachable. After the first display module is removed from the electronic device, the first display module may run as an independent device. For example, the first display module may be an independent device such as a Bluetooth headset, an electronic thermometer, an electronic sphygmomanometer, or a recording pen. The Bluetooth headset may be configured to answer a call after being connected to another device. The electronic thermometer may be configured to measure an ambient temperature or a human body temperature. The electronic thermometer may also be configured to connect to another device, and send measurement data to another electronic device. The electronic sphygmomanometer may be configured to measure human blood pressure, and may send measurement data to another electronic device. The recording pen may be configured to record voice data and may send the voice data to another electronic device.

In a possible embodiment, the second display module is a non-detachable module, and the electronic device further includes a third display module. The first display module, the second display module, and the third display module jointly display content if the first display module and the third display module are disposed on the electronic device; or the first display module, the second display module, and the third display module separately display content if the first display module or the third display module is not disposed on the electronic device. In addition, when the first display module and the third display module are not disposed on the electronic device, the first display module may be connected to the second display module, or the first display module and the second display module may be separately connected to another electronic device, and receive a message sent by the other electronic device.

In a possible embodiment, the first display module is capable of charging the second display module, or the second display module is capable of charging the first display module.

According to still another aspect, an embodiment provides a computer storage medium, configured to store a computer software instruction used by the foregoing electronic device, and the computer software instruction includes a program configured to perform the foregoing aspects.

The first display apparatus and the second display apparatus jointly display the first display content if the first display apparatus is disposed on the electronic device. In other words, the first display apparatus and the second display apparatus separately display partial display content of the first display content. If the first display apparatus is not disposed on the electronic device, the first display apparatus may display the second display content, the second display content is related to the first display content, and the second display apparatus may display the third display content. Thus, the first display apparatus and the second display apparatus may separately display different display content, to improve display utilization of the electronic device or display flexibility, optimize a display function and/or an interaction function of the electronic device, and improve operation experience of the user.

BRIEF DESCRIPTION OF DRAWINGS

FIG. 3A is a schematic diagram of an electronic device from which a detachable apparatus has been removed according to an embodiment;

FIG. 4 is a schematic flowchart of a display method according to an embodiment;

DESCRIPTION OF EMBODIMENTS

An electronic device in the embodiments may be an intelligent electronic device with a display screen, such as a smart band, a smartwatch, a point of sale (POS), or an in-vehicle computer, or may be a mobile phone, a notebook computer, a tablet computer, or the like that has at least two display apparatuses.

Figure 1:
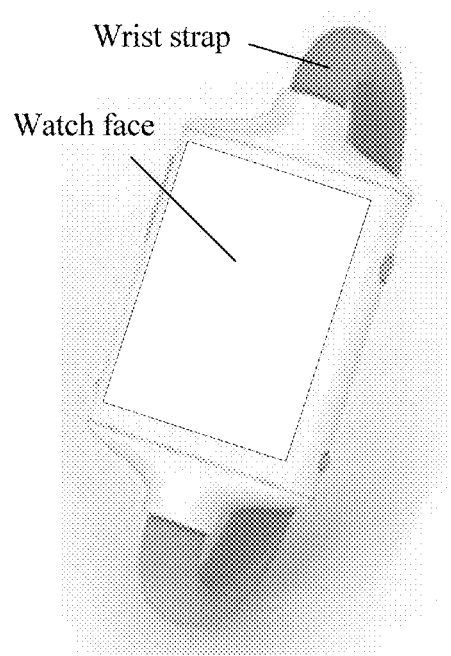
FIG. 1 is a schematic diagram of a smart band according to an embodiment.

The electronic device may include at least two apparatuses for displaying, for example, a first display apparatus and a second display apparatus. The first display apparatus and the second display apparatus each may be a detachable apparatus or a non-detachable apparatus. The detachable apparatus may be an apparatus that can perform normal displaying after being detached from the electronic device, and the non-detachable apparatus may be an apparatus that cannot be detached from the electronic device, or an apparatus that cannot perform normal displaying after being detached from the electronic device. An example in which the electronic device is a smart band is used for description in the embodiments. As shown in FIG. 1, the smart band may include a wrist strap and a watch face. For example, a structure of the watch face may be shown in FIG. 2 or FIG. 2a. For example, the watch face may include one detachable apparatus and two non-detachable apparatuses, or the watch face may include one detachable apparatus and one non-detachable apparatus. The two non-detachable apparatuses shown in FIG. 2 may also be considered as one non-detachable apparatus. Whether the two non-detachable apparatuses can be considered as one non-detachable apparatus is determined by distinguishing between display control methods of the two non-detachable apparatuses. For example, if the two non-detachable apparatuses are collectively controlled, there may be one non-detachable apparatus; or if the two non-detachable apparatuses can be separately controlled, there may be two non-detachable apparatuses. This is not limited in the embodiments. Similarly, the watch face may have another composition manner. The detachable apparatus may be removed from the watch face, or may be reinserted into the watch face. The detachable apparatus can perform normal displaying when being removed from the watch face. The non-detachable apparatus cannot be removed from the watch face. In other words, the non-detachable apparatus is integrated with the wrist strap. The non-detachable apparatus can perform normal displaying if the non-detachable apparatus is removed from the watch face. FIG. 3 is a schematic diagram of a watch face from which a detachable apparatus has been removed based on the schematic diagram shown in FIG. 2. FIG. 3a is a schematic diagram of a watch face from which a detachable apparatus has been removed based on the schematic diagram shown in FIG. 2a. It should be noted that inserting the detachable apparatus into the watch face indicates that the detachable apparatus is disposed on the watch face, and removing the detachable apparatus from the watch face indicates that the detachable apparatus is not disposed on the watch face. The detachable apparatus disposed on the watch face may be electrically connected to the watch face. Whether the detachable apparatus is disposed on the watch face may be detected in a number of ways. For example, the detachable apparatus and the non-detachable apparatus may detect, using a Hall effect sensor, USB contact, or near field communication (NFC) technology, whether the detachable apparatus is disposed on the watch face. This is not limited in the embodiments. Therefore, when a user receives and sends a short message, performs an operation on WeChat, or scans a picture including a two-dimensional code, two apparatuses that can display content may be disposed together for joint displaying, to increase display space of the electronic device. In addition, when the user makes a call, the detachable apparatus may be detached from the watch face and used as a Bluetooth headset. In this case, the detachable apparatus and the non-detachable apparatus separately display content, so that the two parts display content more flexibly, and operation experience of the user is improved.

An example in which an electronic device includes one detachable apparatus and two non-detachable apparatuses is used below to describe a display method related to the embodiments. The two non-detachable apparatuses may have the same working principle. The two non-detachable apparatuses may be used as one non-detachable apparatus. As shown in FIG. 4, the display method includes the following steps.

In step S401, a first display apparatus and a second display apparatus jointly display first display content if the first display apparatus is disposed on the electronic device.

The first display apparatus is a detachable apparatus, and the second display apparatus is a non-detachable apparatus. After the electronic device detects that the detachable apparatus is inserted into a watch face, the detachable apparatus and the non-detachable apparatus may jointly display the first display content. The detachable apparatus is configured to display partial content of the first display content, and the non-detachable apparatus is configured to display remaining display content other than the partial display content in the first display content.

In step S402, a first display apparatus and a second display apparatus separately display content if the first display apparatus is not disposed on the electronic device, where the first display apparatus displays second display content, the second display content is related to first display content, and the second display apparatus displays third display content.

Thus, when the electronic device detects that the detachable apparatus is removed from the watch face, the detachable apparatus and the non-detachable apparatus may separately display content. At least one of display content of the detachable apparatus and display content of the non-detachable apparatus is independent display content that is not associated with other display content and is not affected by the other display content.

When the detachable apparatus is removed from the electronic device, the display content on the detachable apparatus may be the second display content, and the second display content may be related to the first display content. That the second display content is related to the first display content indicates that the second display content may be partial display content or entire display content of the first display content. The partial display content or entire display content herein refers to some or all objects displayed in the first display content. For example, the second display content on the detachable apparatus may be display content obtained after uniform scaling is performed on the first display content, or display content obtained after uniform scaling is performed on partial display content of the first display content. The detachable apparatus may also adjust a layout format, a resolution, or a display format of a to-be-displayed object. In other words, the second display content and the first display content may be displayed in different layout formats, resolutions, or display formats.

In addition, when the detachable apparatus is removed from the electronic device, the non-detachable apparatus may display the third display content. The third display content may be preset content or content related to the first display content. The content related to the first display content may be some or all objects in the first display content. The preset content displayed by the non-detachable apparatus may be a screen image in a preset color on which no object is displayed (such as a blue screen), a current time, current heartbeat frequency of a user, a quantity of current walking steps of a user, or the like.

Figure 5:
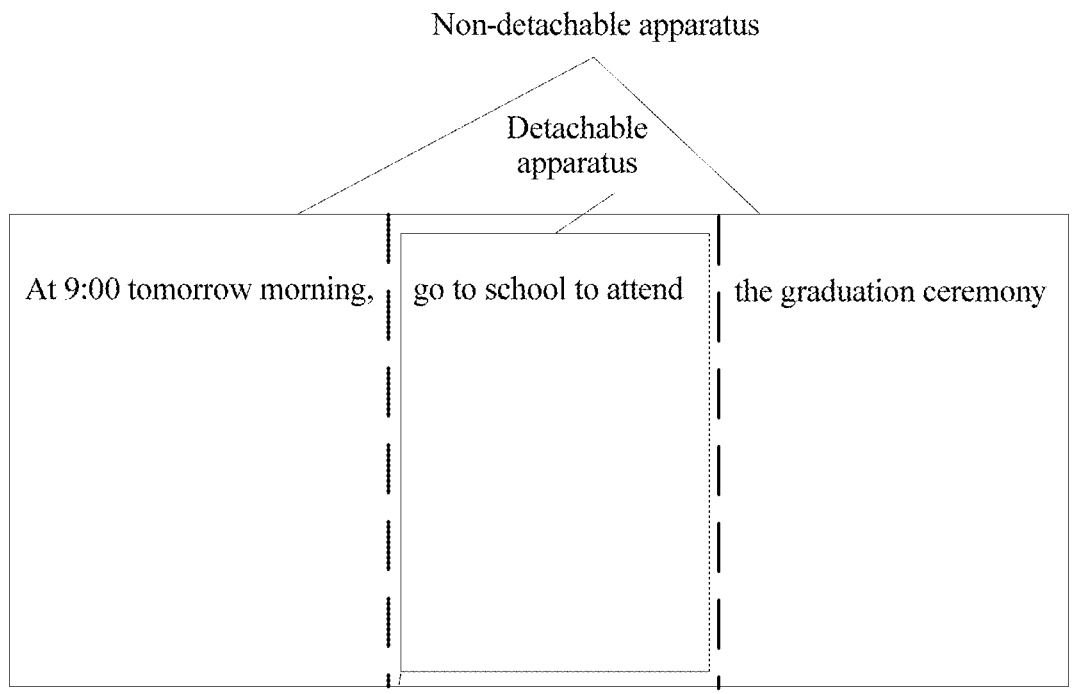
FIG. 5 is a schematic diagram of displaying on an electronic device into which a detachable apparatus has been inserted according to an embodiment.
Figure 6:
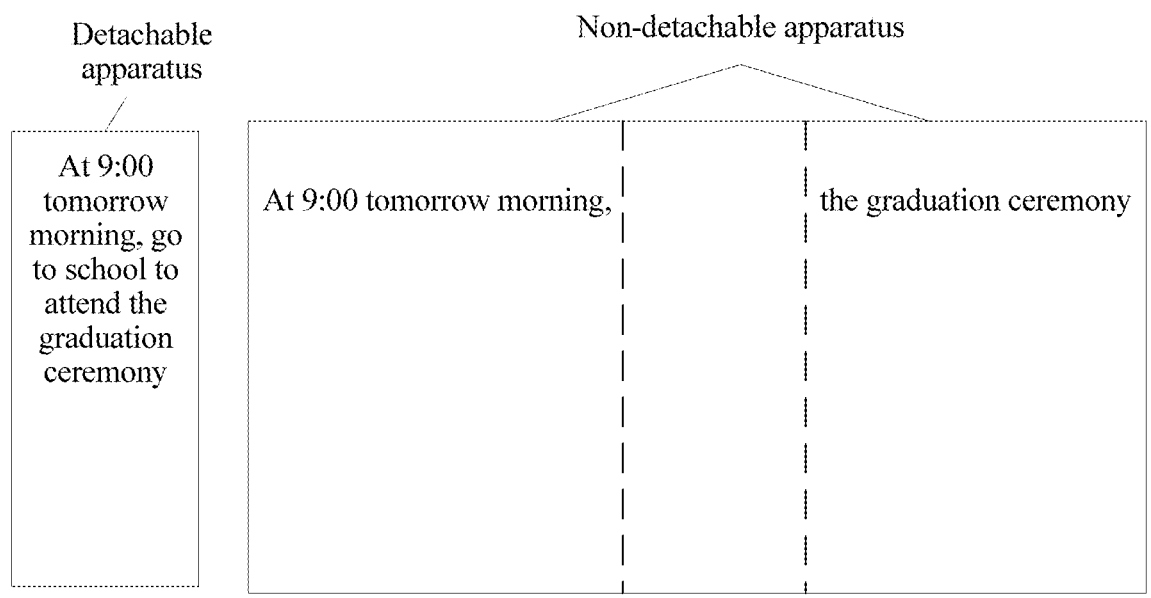
FIG. 6 is a schematic diagram of displaying on an electronic device from which a detachable apparatus has been removed according to an embodiment.
Figure 6A:
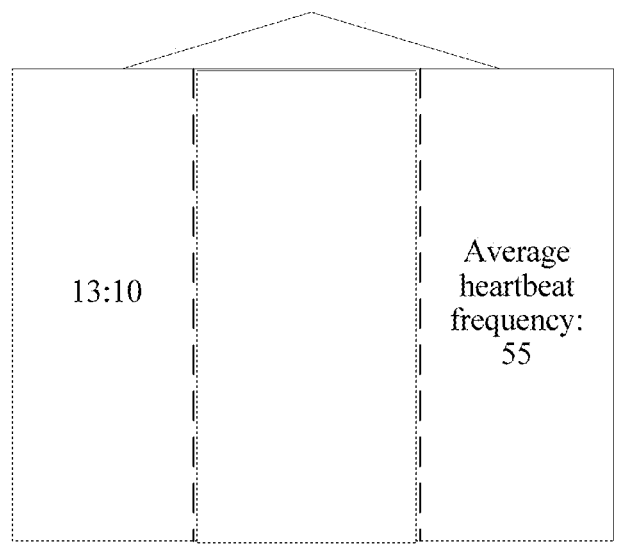
FIG. 6A is a schematic diagram of displaying on a non-detachable apparatus after a detachable apparatus is removed from an electronic device according to an embodiment.

For example, as shown in FIG. 5, when the detachable apparatus is inserted into the electronic device, the detachable apparatus and the non-detachable apparatuses jointly display "At 9:00 tomorrow morning, go to school to attend the graduation ceremony", where the detachable apparatus displays "go to school to attend", and the non-detachable apparatuses display "At 9:00 tomorrow morning," and "the graduation ceremony". After the detachable apparatus is removed from the electronic device, as shown in FIG. 6, the detachable apparatus independently displays "At 9:00 tomorrow morning, go to school to attend the graduation ceremony", and the non-detachable apparatuses may keep current display content of the non-detachable apparatuses unchanged, in other words, display "At 9:00 tomorrow morning," and "the graduation ceremony". Alternatively, the non-detachable apparatuses may display preset content. As shown in FIG. 6A, the non-detachable apparatuses display a current time and current average heartbeat frequency of a user.

Figure 7:
FIG. 7 is a schematic diagram of displaying on an electronic device into which a detachable apparatus has been inserted according to an embodiment.
Figure 7A:
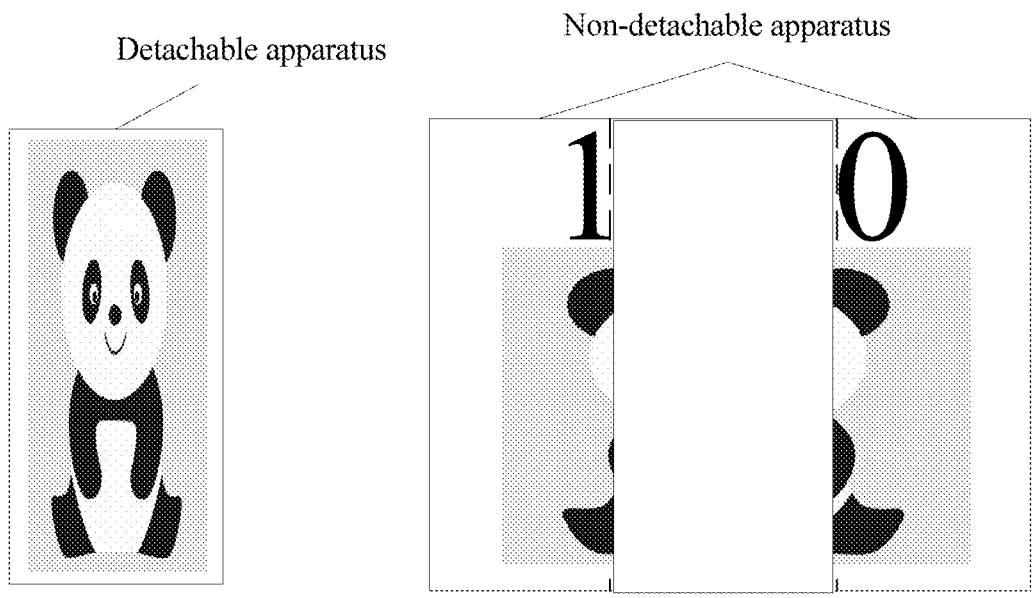
FIG. 7A is a schematic diagram of displaying on an electronic device from which a detachable apparatus has been removed according to an embodiment.

In another example, as shown in FIG. 7, when the detachable apparatus is inserted into the electronic device, the detachable apparatus and the non-detachable apparatuses jointly display a time and a picture. After the detachable apparatus is removed from the electronic device, as shown in FIG. 7A, the detachable apparatus may display only the picture. The non-detachable apparatuses may display the time "17:30", or may display all of the first display content, namely, the entire display content shown in FIG. 7. In addition, when the non-detachable apparatus may display preset content, the preset content may be a picture, a text or system time, or the like. This is not limited in this embodiment.

In a possible embodiment, if the electronic device includes one non-detachable apparatus and two detachable apparatuses, after one or both of the detachable apparatuses are inserted into the electronic device, the non-detachable apparatus and the detachable apparatus(es) may jointly display the first display content. After one or both of the detachable apparatuses are removed from the electronic device, the non-detachable apparatus and the detachable apparatus(es) separately display content. If the electronic device includes a number of detachable apparatuses, after one of the detachable apparatuses is removed from the electronic device, the detachable apparatuses may jointly display the first display content, and when one of the detachable apparatuses is inserted into the electronic device, the detachable apparatuses may separately display the first display content.

Figure 8:
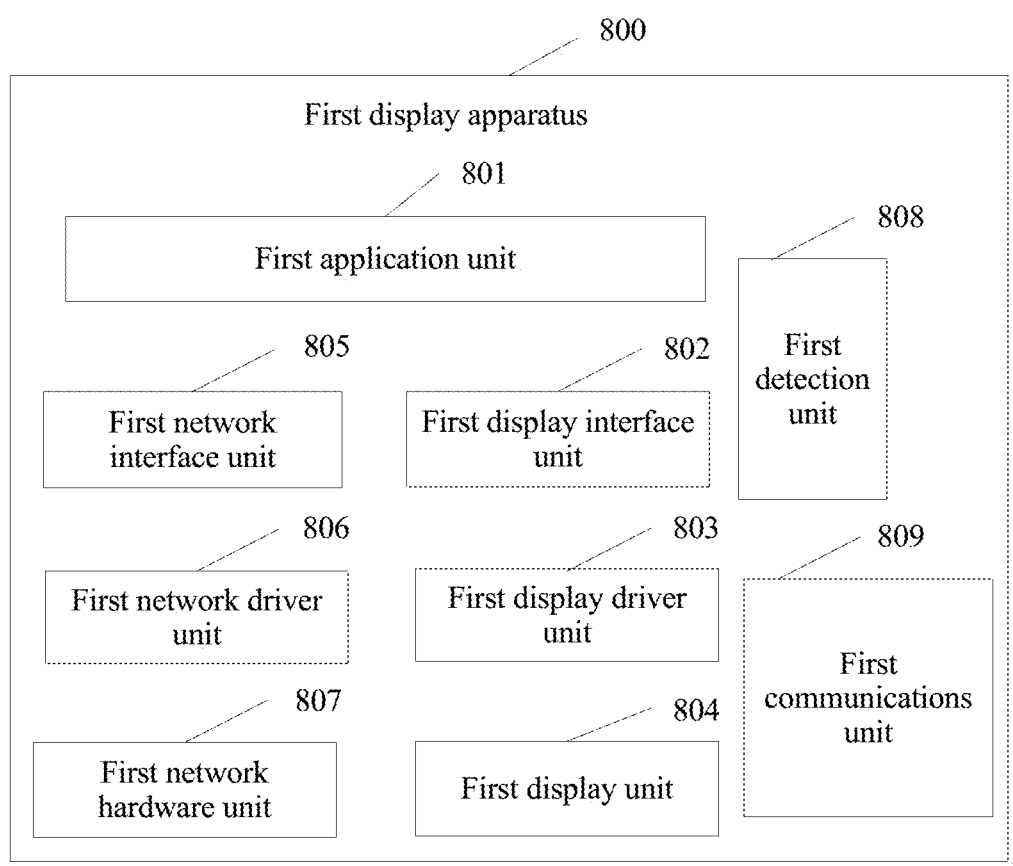
FIG. 8 is a schematic diagram of an internal structure of a first display apparatus according to an embodiment.

FIG. 8 is a schematic diagram of an internal structure of a first display apparatus of an electronic device according to an embodiment. In this embodiment, the first display apparatus 800 may include a first application unit 801, a first display interface unit 802, a first display driver unit 803, a first display unit 804, a first network interface unit 805, a first network driver unit 806, a first network hardware unit 807, a first detection unit 808, and a first communications unit 809. It should be noted that a unit may be added to the first display apparatus, a unit included in the first display apparatus may be deleted, or units included in the first display apparatus may be combined. A functional unit of the first display apparatus is not limited in this embodiment.

The first network hardware unit 807 is configured to encode, send and receive, and perform error correction on a network signal. Network hardware may be a hardware device that supports a wireless communications technology such as Wireless Fidelity (Wi-Fi), Long Term Evolution (LTE), or Bluetooth ( ). The first network driver unit 806 is configured to initialize each hardware unit of the first display apparatus, and drive each hardware unit to perform transmission/reception for a network communications service. The first network interface unit 805 is configured to provide a network communications interface for the first application unit 801. The first application unit 801 is configured to: receive and parse a service, invoke the first display driver unit 803 to initialize the first display unit 804 based on a hardware parameter of the first display unit 804, and invoke the first display interface unit 802 to instruct the first display unit 804 to display service content. The first display unit 804 is configured to display to-be-displayed content using display hardware. The display hardware may be a light emitting diode (LED), an organic light-emitting diode (OLED), or another technical screen. This is not limited in this embodiment. The first communications unit 809 may be configured to transmit data, or may be configured to detect a state in which the first display apparatus is inserted into or removed from the electronic device. The first communications unit may be a universal serial bus (USB), a serial port RS232, or the like, and a hardware type of the first communications unit is not limited in this embodiment. The first detection unit 808 is configured to detect whether the first display apparatus is inserted into or removed from the electronic device. The first detection unit may be a sensor such as a Hall effect sensor.

In this embodiment, the first detection unit 808 may be configured to detect whether the first display apparatus is disposed on the electronic device.

The first display unit 804 may be configured to display partial content of first display content, or display second display content, where the second display content is related to the first display content. In other words, the first display unit 804 may be configured to: display content that the first display apparatus needs to display when the first display apparatus and a second display apparatus jointly display content, or display content that the first display apparatus needs to display when the first display apparatus and a second display apparatus separately display content. A function of the first display unit 804 may be implemented by a first display (or a display screen). In other words, the first display may be configured to display the partial content of the first display content, or display the second display content, where the second display content is related to the first display content.

The first communications unit 809 may be configured to: send remaining content of the first display content to the second display apparatus, and receive a first setting message and/or a second setting message sent by a user using another electronic device. A function of the first communications unit 809 may be implemented by a first communications interface. In other words, the first communications interface may be configured to: send the remaining content of the first display content to the second display apparatus, and receive the first setting message and/or the second setting message sent by the user using the other electronic device.

The first apparatus may further include a first input/output unit, configured to receive a first operation instruction and/or a second operation instruction entered by the user. A function of the first input/output unit may be implemented by a first input/output device. In other words, the first input/output device is configured to receive the first operation instruction and/or the second operation instruction entered by the user.

It may be understood that the first display apparatus shown in FIG. 8 may be configured to perform method steps related to a first display apparatus in FIG. 11, FIG. 13A and FIG. 13B, FIG. 14A and FIG. 14B, and FIG. 21A and FIG. 21B. For exemplary implementation details of performing the method, refer to related descriptions in FIG. 11, FIG. 13A and FIG. 13B, FIG. 14A and FIG. 14B, and FIG. 21A and FIG. 21B. No enumeration is provided herein. All features and technical effects in FIG. 11, FIG. 13A and FIG. 13B, FIG. 14A and FIG. 14B, and FIG. 21A and FIG. 21B are applicable to the first display apparatus 800.

Figure 9:
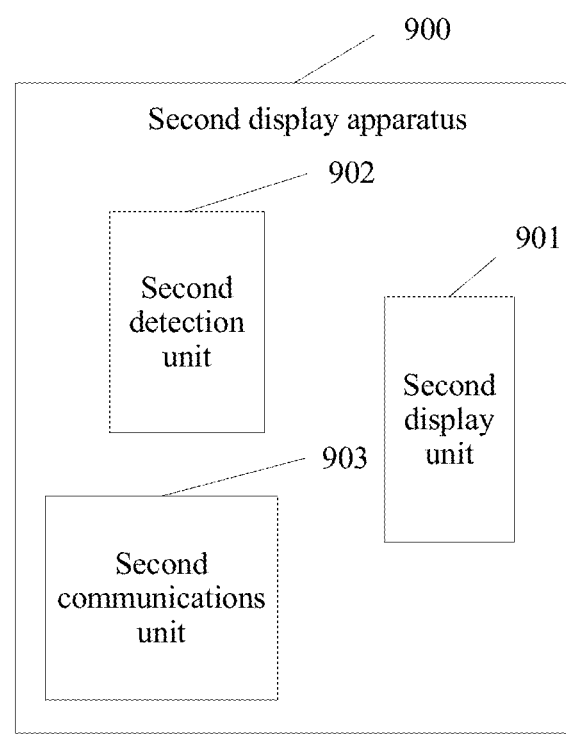
FIG. 9 is a schematic diagram of an internal structure of a second display apparatus according to an embodiment.

FIG. 9 is a schematic diagram of an internal structure of a second display apparatus of the electronic device according to an embodiment. The second display apparatus 900 may include a second display unit 901, a second detection unit 902, and a second communications unit 903.

In this embodiment, the second display unit 901 is configured to display third display content, and the third display content may be preset display content or display content related to the first display content. In a possible embodiment, display hardware of different types of materials may be used for the first display apparatus and the second display apparatus. For example, cheaper display hardware may be used for the second display apparatus and more expensive display hardware may be used for the first display apparatus, to reduce production costs of the electronic device.

The second detection unit 902 is configured to detect whether the first display apparatus is disposed on the electronic device.

The second communications unit 903 may be configured to receive remaining content that is of the first display content and that is sent by the first display apparatus.

Figure 10:
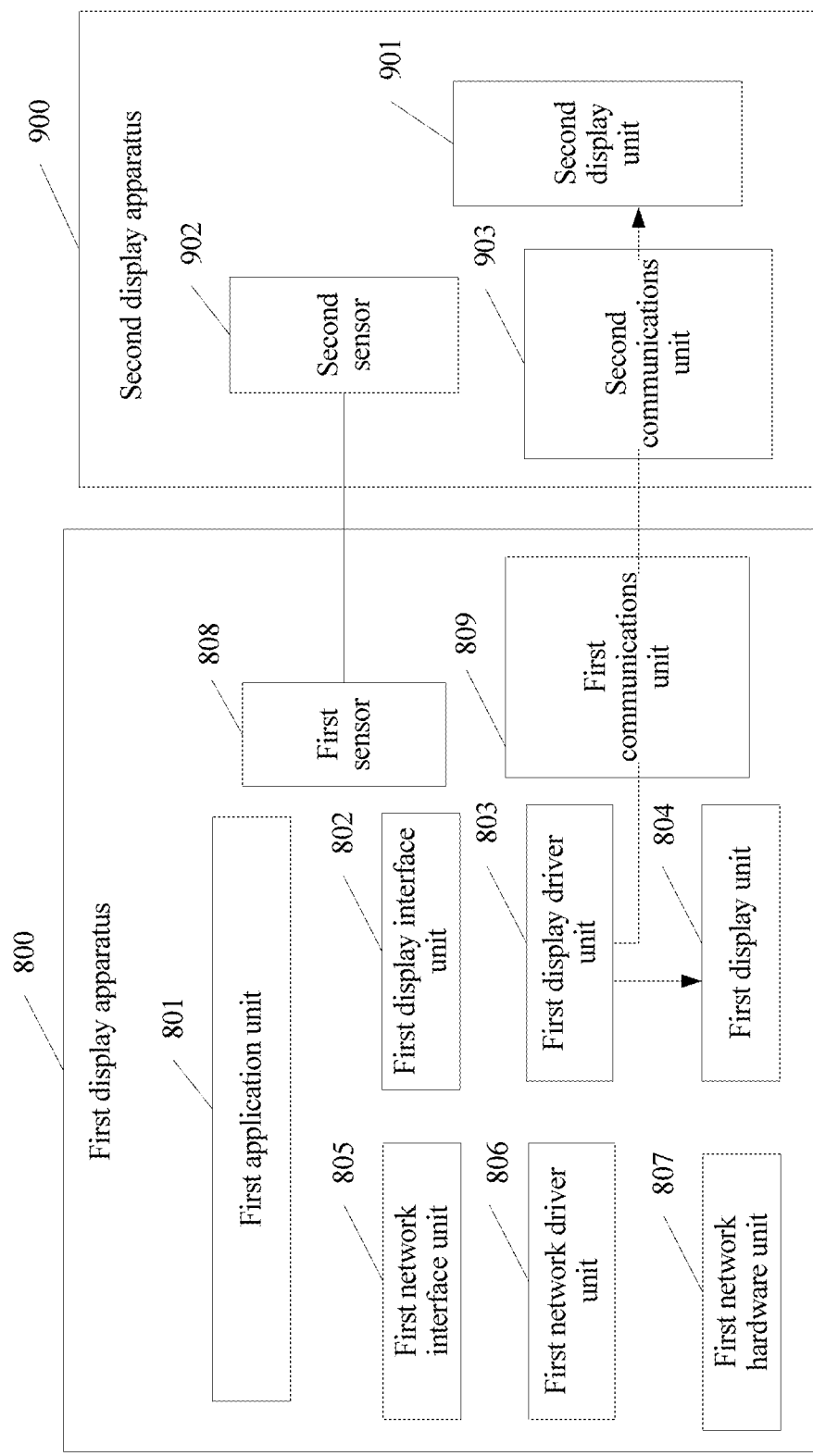
FIG. 10 is a schematic diagram of a connection between a first display apparatus and a second display apparatus according to an embodiment.

When the first display apparatus is inserted into the electronic device, a schematic diagram of a possible connection between the first display apparatus and the second display apparatus is shown in FIG. 10. The first display apparatus 800 may read, using the first display driver unit 803, a hardware parameter of the first display unit 804 of the first display apparatus 800 and a hardware parameter of the second display unit 901 of the second display apparatus 900. The first display apparatus 800 may detect, using a first sensor 808, whether the first display apparatus is inserted into the electronic device, and the first sensor 808 may be used cooperatively with a second sensor. The first display apparatus 800 may send display content or configuration information to the second display apparatus using the first communications unit.

It may be understood that the second display apparatus shown in FIG. 9 may be configured to perform method steps related to a first display apparatus in FIG. 11, FIG. 13A and FIG. 13B, FIG. 14A and FIG. 14B, and FIG. 21A and FIG. 21B. For exemplary implementation details of performing the method, refer to related descriptions in FIG. 11, FIG. 13A and FIG. 13B, FIG. 14A and FIG. 14B, and FIG. 21A and FIG. 21B. No enumeration is provided herein. All features and technical effects in FIG. 11, FIG. 13A and FIG. 13B, FIG. 14A and FIG. 14B, and FIG. 21A and FIG. 21B are applicable to the second display apparatus 900.

Figure 10A:
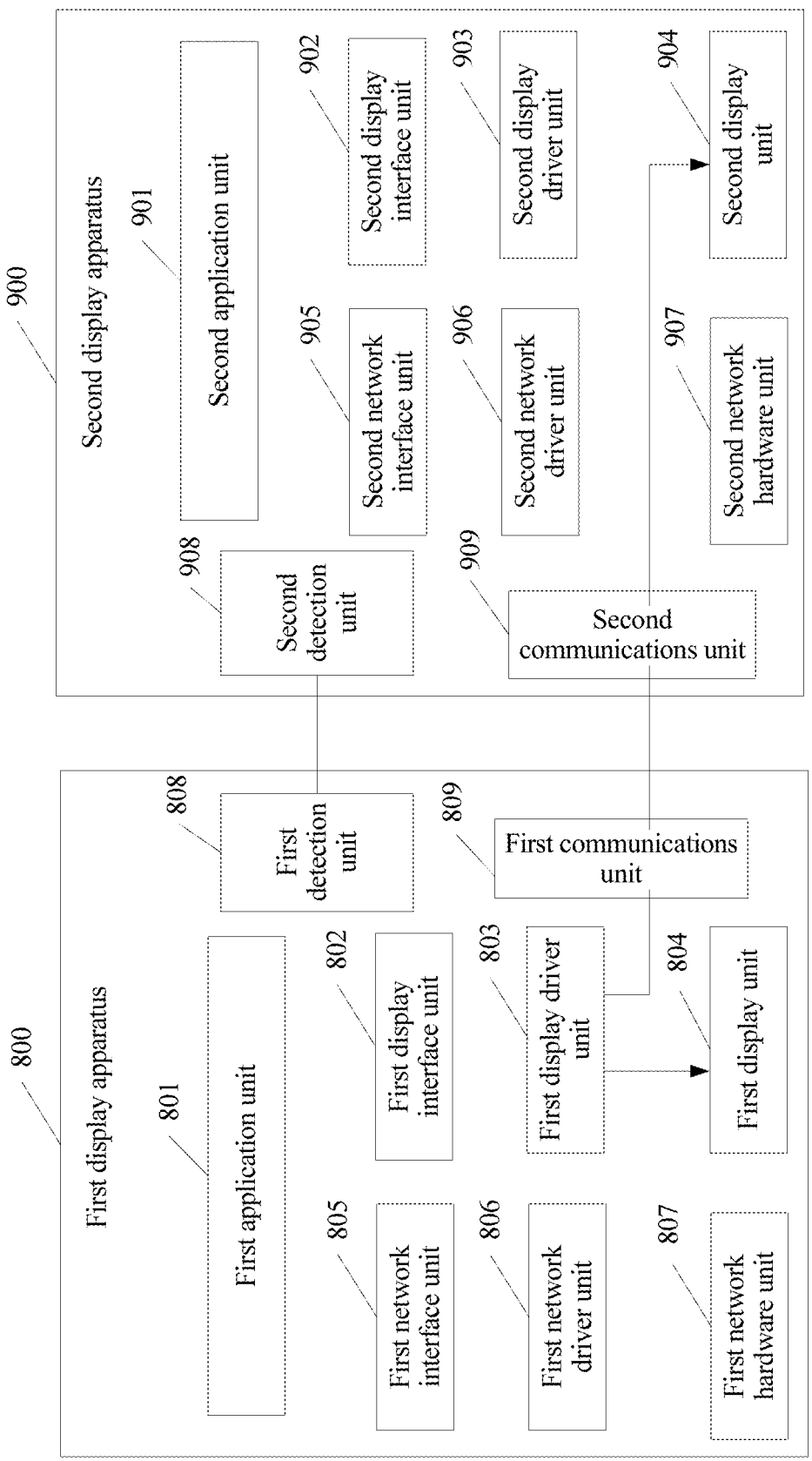
FIG. 10A is a schematic diagram of a connection between a first display apparatus and a second display apparatus according to an embodiment.

It should be noted that the schematic diagram of the internal structure of the second display apparatus may alternatively be shown in FIG. 8. When the internal structure of the first display apparatus or the second display apparatus is shown in FIG. 8, the first display apparatus or the second display apparatus may be used as an independent device. FIG. 10A is a schematic diagram of a possible connection between the first display apparatus and the second display apparatus when the first display apparatus is inserted into the electronic device. The second display apparatus may include a second application unit 901, a second display interface unit 902, a second display driver unit 903, a second display unit 904, a second network interface unit 905, a second network driver unit 906, a second network hardware unit 907, a second detection unit 908, and a second communications unit 909. Similarly, the first display driver unit 803 may read a hardware parameter of the first display unit 804 and a hardware parameter of the second display unit 904.

When the electronic device includes at least one detachable apparatus and at least one non-detachable apparatus, at least one of the detachable apparatus and the non-detachable apparatus may be selected as a primary control apparatus. A schematic diagram of an internal structure of the primary control apparatus may be shown in FIG. 8. The primary control apparatus may control displaying of the detachable apparatus and the non-detachable apparatus after the detachable apparatus is inserted into the electronic device. When the detachable apparatus is used as a primary control apparatus and the non-detachable apparatus is used as a secondary apparatus, the non-detachable apparatus cannot communicate with another electronic device if the detachable apparatus is not inserted into the electronic device. If the detachable apparatus detects that the detachable apparatus is inserted into the electronic device, the detachable apparatus may send, to the non-detachable apparatus, display content to be displayed by the non-detachable apparatus. Therefore, the detachable apparatus controls displaying of the non-detachable apparatus. The detachable apparatus may further set a parameter of the non-detachable apparatus based on a setting parameter received from another electronic device. When the non-detachable apparatus is used as a primary control apparatus, and the detachable apparatus is used as a secondary apparatus, if the non-detachable apparatus detects that the detachable apparatus is inserted into the electronic device, the non-detachable apparatus may send, to the detachable apparatus, display content to be displayed by the detachable apparatus, and may further set a parameter of the detachable apparatus based on a setting parameter received from another electronic device. When the electronic device includes only a detachable apparatus, there are at least two detachable apparatuses. At least one of the detachable apparatuses may be selected as a primary control apparatus, and the primary control apparatus may control displaying of the at least two detachable apparatuses after the at least two detachable apparatuses are inserted into the electronic device. In a possible embodiment, whether a detachable apparatus or a non-detachable apparatus is a primary control device may be determined by default before the electronic device is delivered from a factory.

In a possible embodiment, detachable apparatuses and non-detachable apparatuses of electronic devices of different users may be compatible with each other. In other words, detachable apparatuses and non-detachable apparatuses of electronic devices of different users may be interchanged. For example, a detachable apparatus of an electronic device of a user A may be inserted into a non-detachable apparatus of an electronic device of a user B, or a detachable apparatus of an electronic device of a user B may be inserted into a non-detachable apparatus of an electronic device of a user A. It may be understood that after detachable apparatuses and non-detachable apparatuses of electronic devices of different users are interchanged, an identity of an electronic device may be determined by a primary control apparatus in the electronic device. The primary control apparatus of the electronic device may be configured by the user using another electronic device or by using a setting interface of the electronic device.

The following provides an embodiment of an electronic device in which a detachable apparatus uses the internal structure in FIG. 8 and is used as a primary control apparatus, and a non-detachable apparatus uses the internal structure in FIG. 9.

Figure 2:
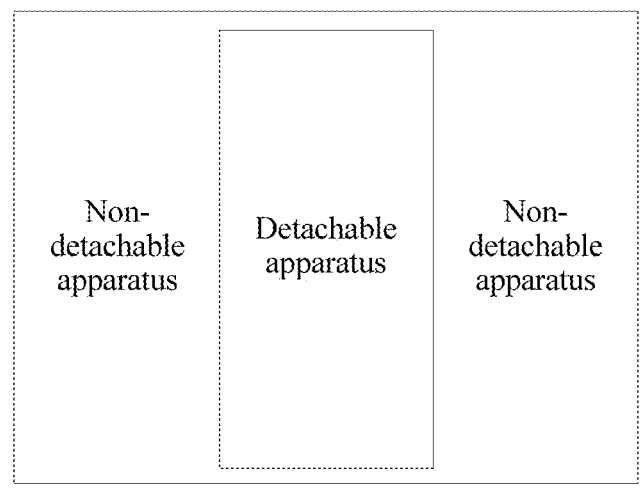
FIG. 2 is a schematic diagram of an electronic device into which a detachable apparatus has been inserted according to an embodiment.
Figure 2A:
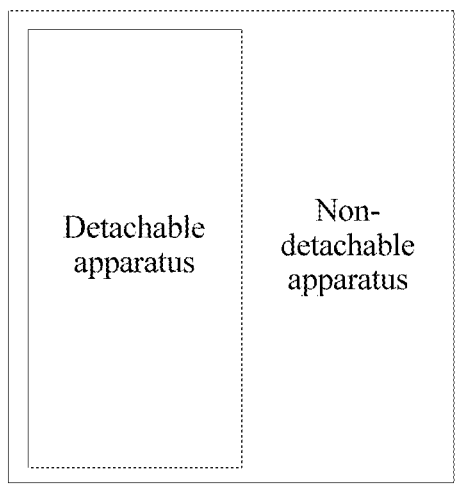
FIG. 2A is a schematic diagram of an electronic device into which a detachable apparatus has been inserted according to an embodiment.
Figure 3:
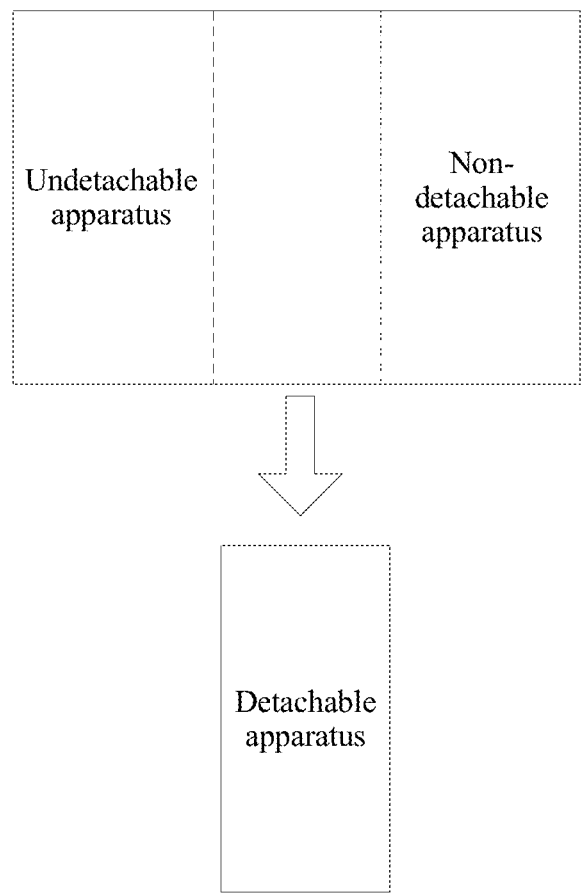
FIG. 3 is a schematic diagram of an electronic device from which a detachable apparatus has been removed according to an embodiment.

As shown in FIG. 2, an example in which the electronic device includes one detachable apparatus and two non-detachable apparatuses is used for description. When the detachable apparatus is not inserted into the electronic device, when the detachable apparatus detects that the detachable apparatus is inserted into the electronic device, the detachable apparatus reads a hardware parameter of the detachable apparatus and a hardware parameter of the non-detachable apparatus, to obtain display content of the detachable apparatus and display content of the non-detachable apparatus. The hardware parameter may include a screen size, a display position, and another parameter.

An implementation in which the detachable apparatus reads a display position parameter of the non-detachable apparatus may be determining that there are two non-detachable apparatuses and the two non-detachable apparatuses are respectively located on two sides of the detachable apparatus. An implementation in which the detachable apparatus reads a screen size parameter of the non-detachable apparatus may be determining that screen size parameters of the two non-detachable apparatuses are both 1 cm*2 cm (0.39 in*0.79 in). An implementation in which the detachable apparatus reads a display position parameter of the detachable apparatus may be determining that the detachable apparatus is located between the non-detachable apparatuses on the two sides. An implementation in which the detachable apparatus reads a screen size parameter of the detachable apparatus may be determining that the screen size parameter of the detachable apparatus is 1 cm*2 cm (0.39 in*0.79 in).

Optionally, the detachable apparatus may not read a hardware parameter of the non-detachable apparatus. In this case, the hardware parameter of the non-detachable apparatus may be pre-stored in the detachable apparatus.

Then, the detachable apparatus may initialize a display configuration based on a current state (in which the detachable apparatus is inserted into the electronic device) and hardware parameters of the detachable apparatus and the non-detachable apparatuses. After the display configuration is initialized, hardware units related to the detachable apparatus and the non-detachable apparatuses, such as video cards or display modules, may enter a normal working state.

For example, based on the schematic diagram shown in FIG. 2, a first display driver unit 803 of the detachable apparatus may initialize an entire display screen to (1 cm*2 cm)+2*(1 cm*2 cm) (or (0.39 in*0.79 in)+2*(0.39 in*0.79 in)) based on the hardware parameters of the detachable apparatus and the non-detachable apparatuses.

Then, an exemplary process in which the detachable apparatus obtains the display content of the detachable apparatus and the display content of the non-detachable apparatuses may be as follows. A first application unit 801 of the detachable apparatus transmits the display content of the detachable apparatus and the display content of the non-detachable apparatuses to the first display driver unit 803. The first display driver unit 803 calculates display positions, display sizes, and the like for the display content of the detachable apparatus and the non-detachable apparatuses based on the display content and initialized hardware parameters of the detachable apparatus and the non-detachable apparatuses, to prepare for final displaying.

For example, if "At 9:00 tomorrow morning, go to school to attend the graduation ceremony" is to be displayed, a driver of the detachable apparatus may perform calculation based on pixels, or, based on a quantity of words, each word is decomposed into required pixels and a display position and a display size of each word is arranged; and then the words are sequentially displayed.

When the detachable apparatus determines the display content of the detachable apparatus and the display content of the non-detachable apparatuses, the detachable apparatus sends the display content of the non-detachable apparatuses to the non-detachable apparatuses, and displays the display content of the detachable apparatus. The non-detachable apparatuses receive and display the display content that is of the non-detachable apparatuses and that is sent by the detachable apparatus. For example, as shown in FIG. 5, the detachable apparatus determines that the detachable apparatus and the non-detachable apparatuses need to jointly display "At 9:00 tomorrow morning, go to school to attend the graduation ceremony", where the display content of the detachable apparatus may include "go to school to attend", and the third display content of the non-detachable apparatuses may include "At 9:00 tomorrow morning," and "the graduation ceremony". Then, the detachable apparatus displays display content of "go to school to attend" and sends display content of "At 9:00 tomorrow morning," and "the graduation ceremony" to the non-detachable apparatuses. After receiving the display content sent by the detachable apparatus, the non-detachable apparatuses may display "At 9:00 tomorrow morning," and "the graduation ceremony".

When the detachable apparatus is inserted into the electronic device, when it is detected that the detachable apparatus is removed from the electronic device, the detachable apparatus is configured to display the second display content based on the hardware parameter of the detachable apparatus, and the non-detachable apparatuses are configured to keep current display content unchanged or display preset display content. In this case, the display content of the detachable apparatus and the display content of the non-detachable apparatuses are independent of each other. In other words, after the detachable apparatus is removed from the electronic device, the detachable apparatus is configured to display to-be-displayed content based on the hardware parameter of the detachable apparatus without considering hardware parameters of the non-detachable apparatuses, and the non-detachable apparatuses may keep the current display content unchanged or display the preset display content based on a user setting. The detachable apparatus may run as an independent device. For example, the detachable apparatus may be used as an independent device such as a Bluetooth headset, an electronic thermometer, an electronic sphygmomanometer, or a recording pen. The Bluetooth headset may be configured to answer a call after being connected to another electronic device. The electronic thermometer may be configured to measure an ambient temperature or a human body temperature. The electronic thermometer may also be configured to connect to another device such as a mobile phone, and send measurement data to another electronic device. The electronic sphygmomanometer may be configured to measure human blood pressure, and may send measurement data to another electronic device. The recording pen may be configured to record voice data and may send the voice data to another electronic device.

In addition, the user may set a related parameter and a working manner of the electronic device on a setting interface of the primary control apparatus. For example, the electronic device may receive a first operation instruction entered by the user using an input/output apparatus of the electronic device, and the first operation instruction may indicate that the first display apparatus is a primary control apparatus and the second display apparatus is a secondary apparatus; or the electronic device may receive a second operation instruction entered by the user using an input/output apparatus of the electronic device, and the second operation instruction may indicate that the first display apparatus is a secondary apparatus and the second display apparatus is a primary control apparatus.

Figure 11:
FIG. 11 is a schematic diagram of a system architecture including a mobile phone and a detachable apparatus according to an embodiment.

In a possible embodiment, the user may set the related parameter and the working manner of the electronic device using another electronic device, and the other electronic device is an electronic device that can communicate with the detachable apparatus. As shown in FIG. 11, the other electronic device may send a setting message to the detachable apparatus, so that the detachable apparatus sets an enabling manner and a display configuration, and the like of the electronic device based on the setting message. The other electronic device may be a mobile terminal, such as a mobile phone, a notebook computer, a tablet computer, a POS, or an in-vehicle computer, or the other electronic device may be a multimedia device, a streaming media device, a wearable device, or the like.

Figure 11A:
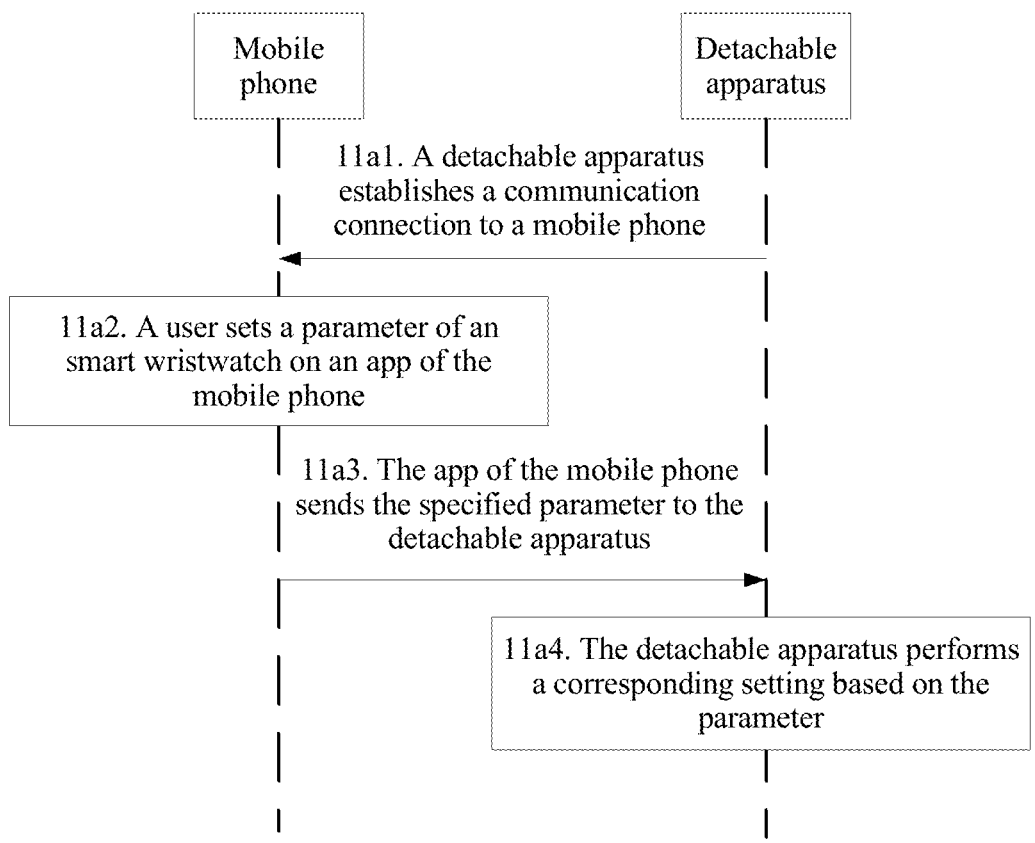
FIG. 11A is a schematic flowchart of setting a parameter of an electronic device using a mobile phone according to an embodiment.

FIG. 11A is used below as an example to describe a process in which a user sets a parameter of a smart band on an app of a mobile phone.

In step 11a1, a detachable apparatus establishes a communication connection to the mobile phone.

Usually, a primary control apparatus of the smart band may establish a communication connection to another electronic device. The detachable apparatus may be connected to the mobile phone using Bluetooth, Wi-Fi, or another wireless or wired technology.

In step 11a2, the user sets a parameter of the smart band on an app of the mobile phone.

The user may set, on the app of the mobile phone, content displayed a non-detachable apparatus after the detachable apparatus is removed from a watch face. The user may further set parameters such as startup configurations and display configurations of the detachable apparatus and the non-detachable apparatus on the app of the mobile phone, or may set parameters such as font sizes and display duration.

When setting an enabling manner of the smart band, the user may select an enabling manner meeting a user requirement from a number of enabling manners. For example, the enabling manners may be as follows:

Manner a: When the detachable apparatus is inserted into the watch face, the detachable apparatus and the non-detachable apparatus are simultaneously powered on when the smart band is started up. It is assumed that there is a physical button on a wrist strap of the smart band. The detachable apparatus and the non-detachable apparatus are simultaneously powered on when the user presses the button. Alternatively, only the detachable apparatus may be powered on when the user presses the button on the wrist strap, and the non-detachable apparatus may be further powered on using the detachable apparatus (for example, using a USB pin). Alternatively, only the non-detachable apparatus may be powered on when the user presses the button, and the detachable apparatus is further powered on using the non-detachable apparatus (for example, using a USB pin).

Manner b: If the smart band is started up after the detachable apparatus is removed from the watch face, when the detachable apparatus is inserted into the smart band, the non-detachable apparatus may be powered on using the detachable apparatus without a user operation.

Manner c: If the non-detachable apparatus of the smart band is powered on after the detachable apparatus is removed from the watch face, when the detachable apparatus is inserted into the watch face, the detachable apparatus may be powered on using the non-detachable apparatus. Whether manner a, manner b, or manner c is selected may be set based on a product power-saving requirement of the user.

Alternatively, it may be contemplated that when the detachable apparatus is inserted into the watch face, the non-detachable apparatus is capable of charging the detachable apparatus, or the detachable apparatus is capable of charging the non-detachable apparatus.

When setting a display configuration of the smart band using an app of a mobile phone, the user may select a display configuration meeting a user requirement from a number of display configurations. For example, the display configuration may be set as follows:

(1) When the detachable apparatus is removed from the watch face, the non-detachable apparatus keeps latest content that is displayed before the detachable apparatus is removed.

Figure 12:
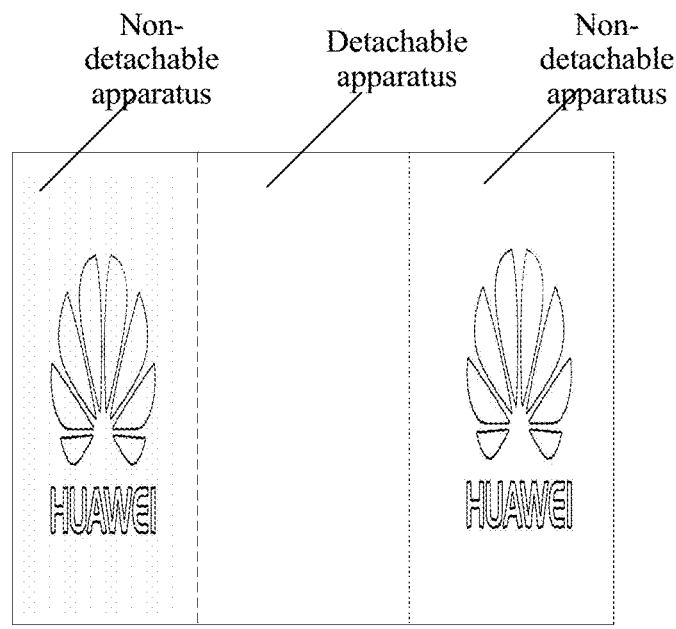
FIG. 12 is a schematic diagram of displaying on a non-detachable apparatus after a detachable apparatus is removed from an electronic device according to an embodiment.
Figure 12A:
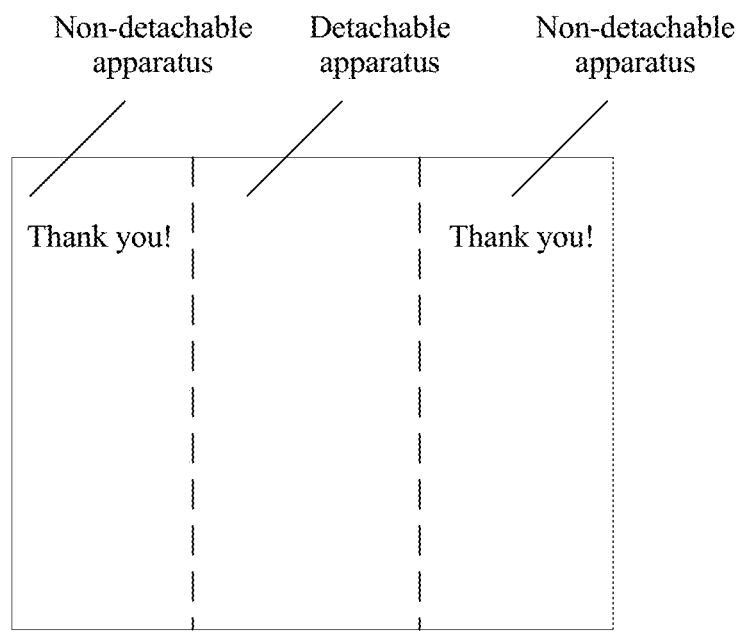
FIG. 12A is a schematic diagram of displaying on a non-detachable apparatus after a detachable apparatus is removed from an electronic device according to an embodiment.

(2) When the detachable apparatus is removed from the watch face, the non-detachable apparatus displays preset content. For example, it is assumed that the preset content is a picture. As shown in FIG. 3A, when the detachable apparatus is removed from the watch face, display content of the non-detachable apparatus may be shown in FIG. 12. It is assumed that the preset content is a text. When the detachable apparatus is removed from the watch face, display content of the non-detachable apparatus may be preset display content. For example, the preset display content may be shown in FIG. 12A.

In a possible embodiment, an implementation in which the detachable apparatus and the non-detachable apparatus are set as a primary control apparatus or a secondary apparatus may be: When the smart band is connected to another electronic device that can communicate with the detachable apparatus, a first setting message is received from the other electronic device, where the first setting message indicates that the detachable apparatus is a primary control apparatus and the non-detachable apparatus is a secondary apparatus, and that the non-detachable apparatus can or cannot communicate with the other electronic device when the detachable apparatus is removed from the watch face. Alternatively, when the smart band is wirelessly connected to another electronic device, a second setting message is received from the other electronic device, where the second setting message indicates that the detachable apparatus is a secondary apparatus and the non-detachable apparatus is a primary control apparatus, and that the non-detachable apparatus can or cannot communicate with the other electronic device when the detachable apparatus is removed from the watch face.

Optionally, the user may perform a setting using an app on a mobile phone. When the detachable apparatus is inserted into the watch face, the detachable apparatus and the non-detachable apparatus work simultaneously. For example, the detachable apparatus and the non-detachable apparatus jointly display one picture. Alternatively, only the detachable apparatus is activated, and the non-detachable apparatus is not activated. For example, only the detachable apparatus displays content, and the non-detachable apparatus shows a black screen. In this case, it may be considered that the non-detachable apparatus is not powered on, and only a detachable part displays content. Therefore, a power-saving requirement of the smart band is met. Alternatively, only the non-detachable apparatus displays content, and the detachable apparatus shows a black screen. In this case, it may be considered that the detachable apparatus is not powered on, and only a non-detachable part displays content. Therefore, a power-saving requirement of the smart band is met.

Optionally, the user may set a timer on the non-detachable apparatus using an app on a mobile phone, to enable the non-detachable apparatus to display a picture for X seconds, where X may be a positive integer. After the timer expires, the non-detachable apparatus is powered off, or, in other words, the non-detachable apparatus shows a black screen.

In step 11a3, the mobile phone sends the specified parameter to the detachable apparatus.

When the user sets, using the app on a mobile phone, related parameters such as display content and enabling manners of the detachable apparatus and the non-detachable apparatus, the other electronic device may send the specified parameters to the detachable apparatus of the smart band.

In step 11a4, the detachable apparatus performs a corresponding setting based on the parameter.

The detachable apparatus may set the display content and the enabling manners of the detachable apparatus and the non-detachable apparatus based on the parameter.

Figure 13A:
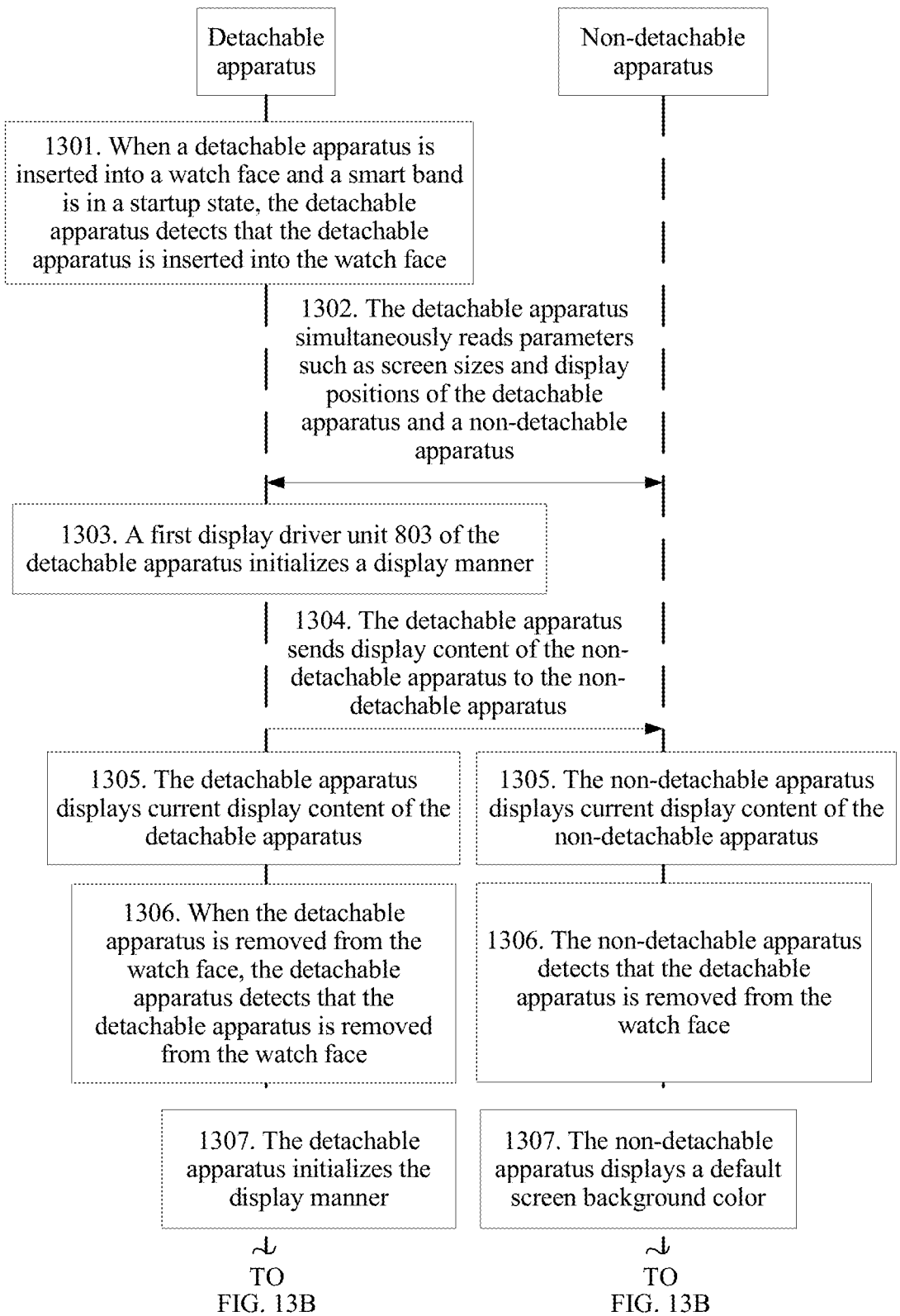
FIG. 13A is a schematic flowchart of removing a detachable apparatus from an electronic device and then inserting the detachable apparatus into the electronic device according to an embodiment.
Figure 13B:
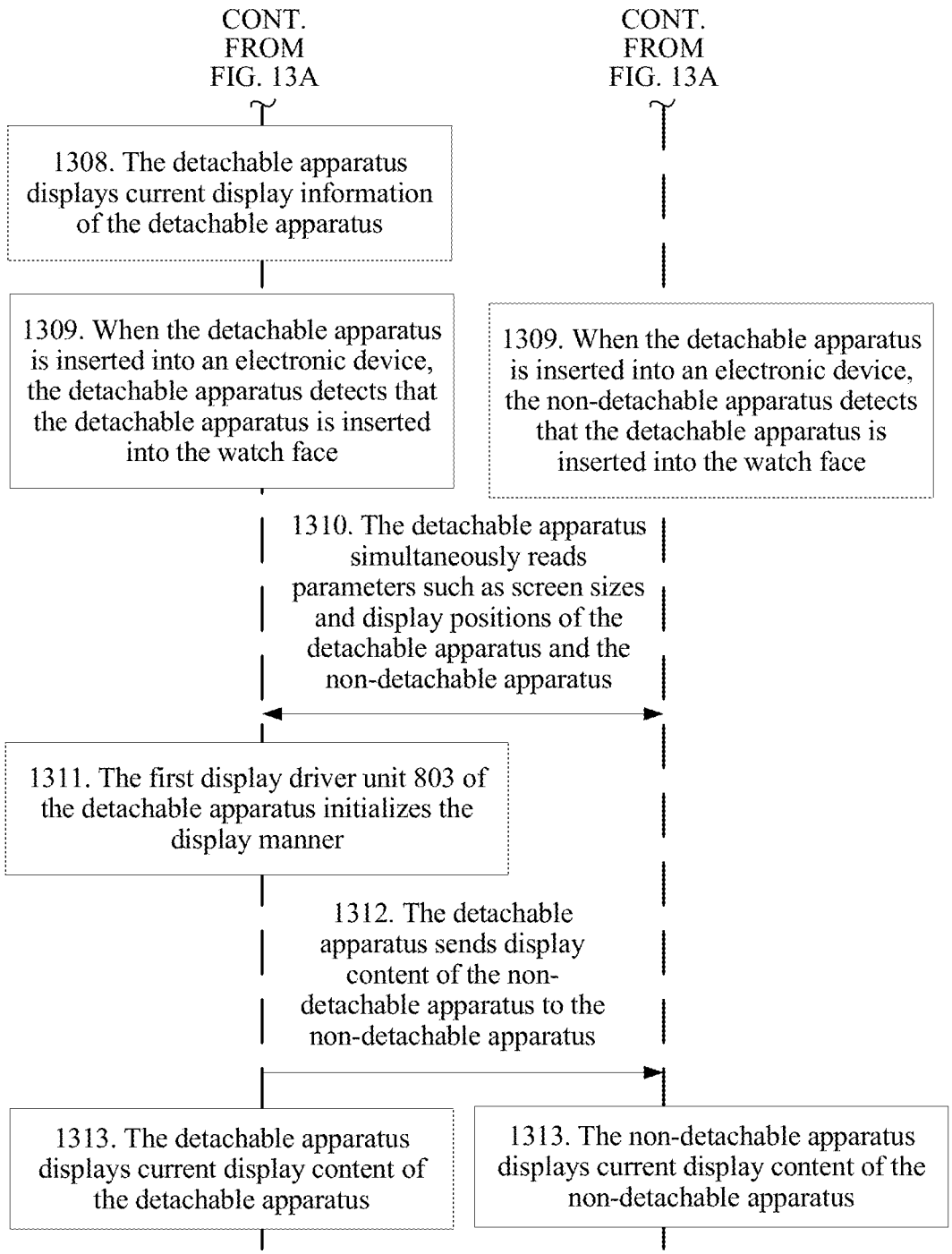
FIG. 13B is a schematic flowchart of removing a detachable apparatus from an electronic device and then inserting the detachable apparatus into the electronic device according to an embodiment.

FIG. 13A and FIG. 13B are used below as an example to describe a process of removing a detachable apparatus inserted into a watch face, and then inserting the detachable apparatus into the watch face. In this case, a smart band includes one detachable apparatus and two non-detachable apparatuses, a structure of the detachable apparatus is shown in FIG. 8, and a structure of the non-detachable apparatus is shown in FIG. 9.

In step 1301, when the detachable apparatus is inserted into the watch face and the smart band is in a startup state, the detachable apparatus detects that the detachable apparatus is inserted into the watch face.

In step 1302, the detachable apparatus simultaneously reads parameters such as screen sizes and display positions of the detachable apparatus and the non-detachable apparatus.

In step 1303, a first display driver unit 803 of the detachable apparatus initializes a display configuration.

In step 1304, the detachable apparatus sends display content of the non-detachable apparatus to the non-detachable apparatus.

In step 1305, the detachable apparatus displays current display content of the detachable apparatus, and at the same time, the non-detachable apparatus displays current display content of the non-detachable apparatus.

In step 1306, when the detachable apparatus is removed from the watch face, the detachable apparatus detects that the detachable apparatus is removed from the watch face, and at the same time, the non-detachable apparatus detects that the detachable apparatus is removed from the watch face.

In step 1307, the detachable apparatus initializes the display configuration, and at the same time, the non-detachable apparatus displays a default screen background color.

In step 1308, the detachable apparatus displays current display information of the detachable apparatus.

In step 1309, when the detachable apparatus is inserted into the watch face, the detachable apparatus detects that the detachable apparatus is inserted into the watch face.

In step 1310, the detachable apparatus simultaneously reads parameters such as screen sizes and display positions of the detachable apparatus and the non-detachable apparatus.

In addition, the detachable apparatus may store the parameters such as the screen sizes and the display positions that are of the detachable apparatus and the non-detachable apparatus and that are read in step 1302, so that in step 1310, stored parameter data is directly invoked without further reading the parameters such as the screen sizes and the display positions that are of the detachable apparatus and the non-detachable apparatus.

In step 1311, the first display driver unit 803 of the detachable apparatus initializes the display configuration.

In step 1312, the detachable apparatus sends display content of the non-detachable apparatus to the non-detachable apparatus.

In step 1313, the detachable apparatus displays current display content of the detachable apparatus, and at the same time, the non-detachable apparatus displays current display content of the non-detachable apparatus.

Figure 14A:
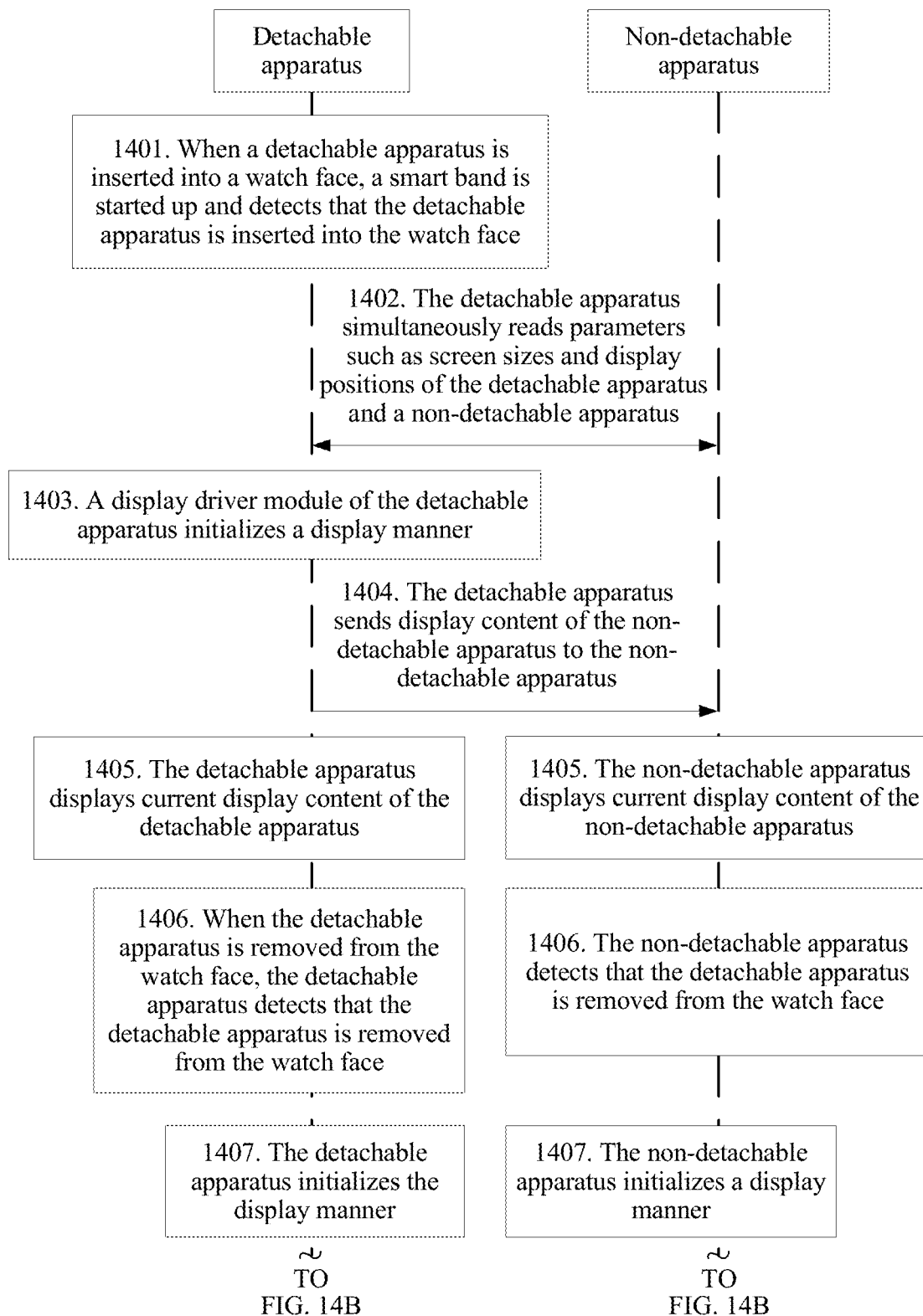
FIG. 14A is a schematic flowchart of removing a detachable apparatus from an electronic device and then inserting the detachable apparatus into the electronic device according to an embodiment.
Figure 14B:
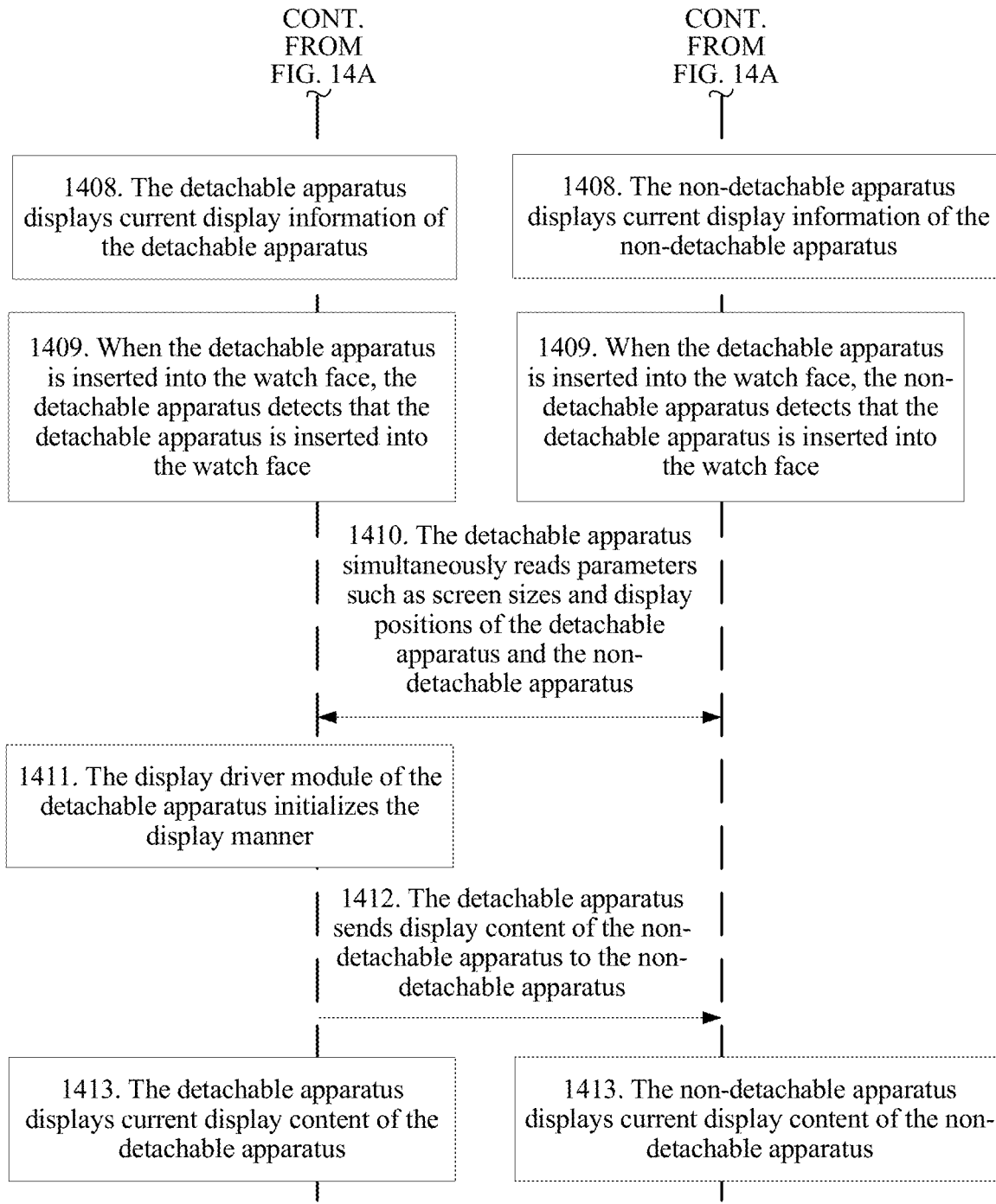
FIG. 14B is a schematic flowchart of removing a detachable apparatus from an electronic device and then inserting the detachable apparatus into the electronic device according to an embodiment.

FIG. 14A and FIG. 14B are used below as an example to describe a process of removing a detachable apparatus inserted into a watch face, and then inserting the detachable apparatus into the watch face. In this case, a smart band includes one detachable apparatus and two non-detachable apparatuses, a structure of the detachable apparatus is shown in FIG. 8, and a structure of the non-detachable apparatus is also shown in FIG. 8.

For steps 1401 to 1406, refer to steps 1301 to 1306.

In step 1407, the detachable apparatus initializes the display configuration, and at the same time, the non-detachable apparatus initializes a display configuration.

In step 1408, the detachable apparatus displays current display information of the detachable apparatus, and at the same time, the non-detachable apparatus displays current display information of the non-detachable apparatus.

It may be understood that both the detachable apparatus and the non-detachable apparatus may establish a communication connection to another electronic device. For example, a detachable device may be a Bluetooth headset, and a non-detachable device may be a heart rate or blood pressure measurement instrument. When a user makes a call, a heart rate may be measured at the same time.

For steps 1409 to 1413, refer to steps 1309 to 1313.

Therefore, because the electronic device includes the detachable apparatus and the non-detachable apparatuses, when the detachable apparatus is removed from the electronic device, the detachable apparatus may be configured to display second display content based on a hardware parameter of the detachable apparatus, and the non-detachable apparatus may be configured to keep current display content unchanged or display preset display content. Thus, the detachable apparatus and the non-detachable apparatus may separately display content. Alternatively, when the detachable apparatus is inserted into the electronic device, the detachable apparatus may obtain display content of the detachable apparatus and display content of the non-detachable apparatus based on a hardware parameter of the detachable apparatus and a hardware parameter of the non-detachable apparatus, and then send the display content of the non-detachable apparatus to the non-detachable apparatus and display the display content of the detachable apparatus; and the non-detachable apparatus may be configured to receive and display the display content that is of the non-detachable apparatus and that is sent by the detachable apparatus. In other words, the detachable apparatus and the non-detachable apparatus may jointly display first display content, to improve display utilization of the electronic device or display flexibility, optimize a display function and/or an interaction function of the electronic device, and improve operation experience of the user.

The following provides a description of an embodiment in which an electronic device includes a first detachable apparatus and a second detachable apparatus, each of the first detachable apparatus and the second detachable apparatus uses the internal structure in FIG. 8, and the first detachable apparatus is used as a primary control apparatus.

Figure 15:
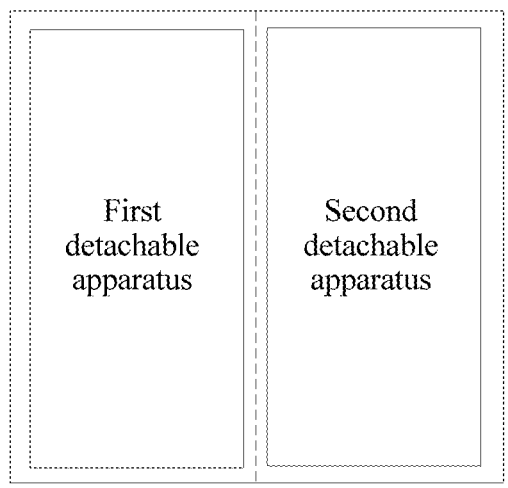
FIG. 15 is a schematic diagram of an electronic device into which both a first detachable apparatus and a second detachable apparatus have been inserted according to an embodiment.

FIG. 15 is a schematic diagram of an electronic device into which two detachable apparatuses of the electronic device have been inserted. When both the first detachable apparatus and the second detachable apparatus are inserted into the electronic device, the first detachable apparatus is located on one side, and the second detachable apparatus is located on the other side.

If the first detachable apparatus and/or the second detachable apparatus are/is not inserted into the electronic device, the following cases may exist: (1) The first detachable apparatus is not inserted into the electronic device, and the second detachable apparatus is inserted into the electronic device. When the first detachable apparatus detects that the first detachable apparatus is inserted into the electronic device, the first detachable apparatus obtains display content of the first detachable apparatus and display content of the second detachable apparatus based on a hardware parameter of the first detachable apparatus and a hardware parameter of the second detachable apparatus. (2) The first detachable apparatus is inserted into the electronic device, and the second detachable apparatus is not inserted into the electronic device. When the first detachable apparatus detects that the second detachable apparatus is inserted into the electronic device, the first detachable apparatus obtains display content of the first detachable apparatus and display content of the second detachable apparatus based on a hardware parameter of the first detachable apparatus and a hardware parameter of the second detachable apparatus. (3) The first detachable apparatus is not inserted into the electronic device, and the second detachable apparatus is not inserted into the electronic device either. When the first detachable apparatus detects that the first detachable apparatus and the second detachable apparatus are inserted into the electronic device, the first detachable apparatus obtains display content of the first detachable apparatus and display content of the second detachable apparatus based on a hardware parameter of the first detachable apparatus and a hardware parameter of the second detachable apparatus.

If the first detachable apparatus detects that both the first detachable apparatus and the second detachable apparatus are inserted into the electronic device, the first detachable apparatus may read the hardware parameter of the first detachable apparatus and the hardware parameter of the second detachable apparatus using a display driver. The hardware parameter may include a screen size, a position, and another parameter.

For example, assuming that the electronic device is shown in FIG. 15, the first detachable apparatus learns that a position parameter of the first detachable apparatus is: the first detachable apparatus is located on one side, and a size parameter of the first detachable apparatus is 2 cm*2 cm (0.79 in*0.79 in); and the first detachable apparatus learns that a position parameter of the second detachable apparatus is: the detachable apparatus is located on the other side, and a size parameter of the second detachable apparatus is 2 cm*2 cm (0.79 in*0.79 in). Optionally, the first detachable apparatus may pre-store the parameters of the second detachable apparatus in the first detachable apparatus.

Then, the first detachable apparatus may initialize a display configuration based on a current state (for example, a state in which both the first detachable apparatus and the second detachable apparatus are inserted into the electronic device) and the hardware parameters of the first detachable apparatus and the second detachable apparatus. After the display configuration is initialized, related hardware such as a video card or a display module may enter a normal working state. For example, as shown in FIG. 15, a first display driver unit 803 of the first detachable apparatus may initialize an entire display screen to (2 cm*2 cm)+(2 cm*2 cm) (or, (0.79 in*0.79 in)+(0.79 in*0.79 in)) based on the hardware parameters of the first detachable apparatus and the second detachable apparatus.

An exemplary process in which the first detachable apparatus obtains the display content of the first detachable apparatus and the display content of the second detachable apparatus may be as follows. A first application unit 801 of the first detachable apparatus transmits the display content of the first detachable apparatus and the display content of the second detachable apparatus to the first display driver unit 803. The first display driver unit 803 calculates display positions, display sizes, and the like for the display content of the first detachable apparatus and the second detachable apparatus based on the display content and initialized hardware parameters of the first detachable apparatus and the second detachable apparatus, to prepare for final displaying.

Then, the first detachable apparatus sends the display content of the second detachable apparatus to the second detachable apparatus, and displays the display content of the first detachable apparatus; and the second detachable apparatus receives and displays the display content that is of the second detachable apparatus and that is sent by the first detachable apparatus.

Figure 15A:
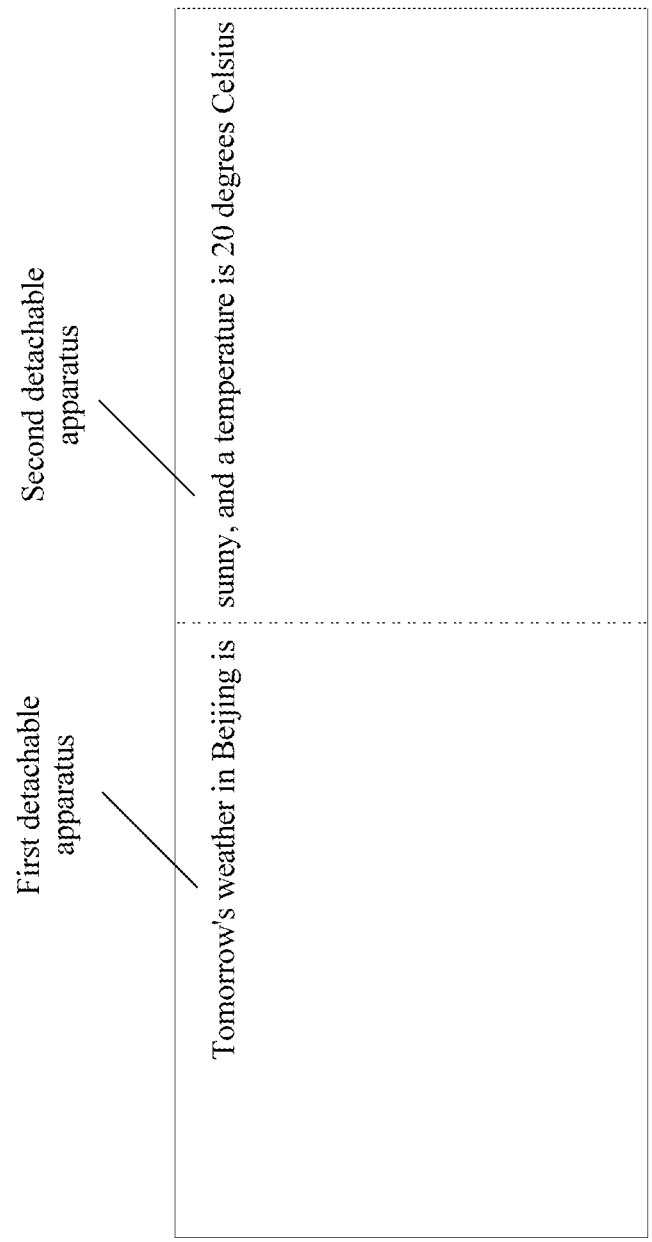
FIG. 15A is a schematic diagram of an electronic device into which both a first detachable apparatus and a second detachable apparatus have been inserted according to an embodiment.

In this case, a possible display result is shown in FIG. 15A. The display content of the first detachable apparatus includes "Tomorrow's weather in Beijing is", and the display content of the second detachable apparatus includes "sunny, and a temperature is 20 degrees Celsius". For example, the first detachable apparatus calculates, based on the hardware parameter of the first detachable apparatus and the hardware parameter of the second detachable apparatus, partial display content that is of to-be-displayed content and that is to be displayed by the first detachable apparatus and partial display content that is of the to-be-displayed content and that is to be displayed by the second detachable apparatus, and sends, to the second detachable apparatus, the partial display content to be displayed by the second detachable apparatus.

Figure 16:
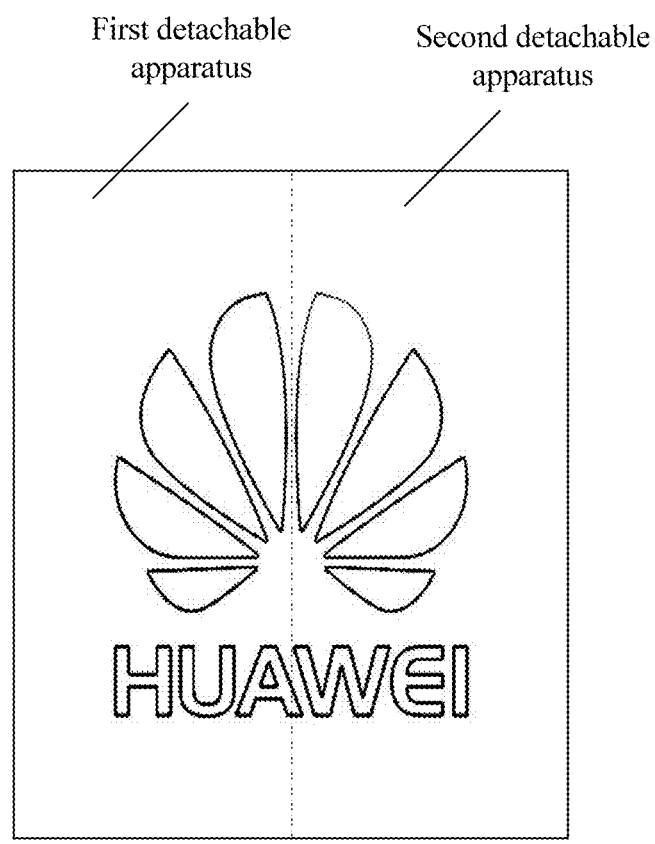
FIG. 16 is a schematic diagram of an electronic device into which both a first detachable apparatus and a second detachable apparatus have been inserted according to an embodiment.

In another example, if a picture is to be displayed, and the first detachable apparatus detects that both the first detachable apparatus and the second detachable apparatus are inserted into the electronic device, a possible display result is shown in FIG. 16.

Figure 17:
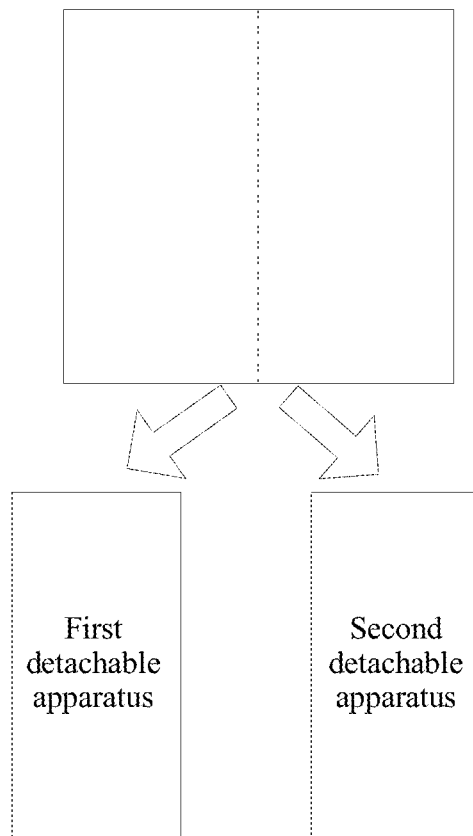
FIG. 17 is a schematic diagram of an electronic device from which both a first detachable apparatus and a second detachable apparatus have been removed according to an embodiment.
Figure 18:
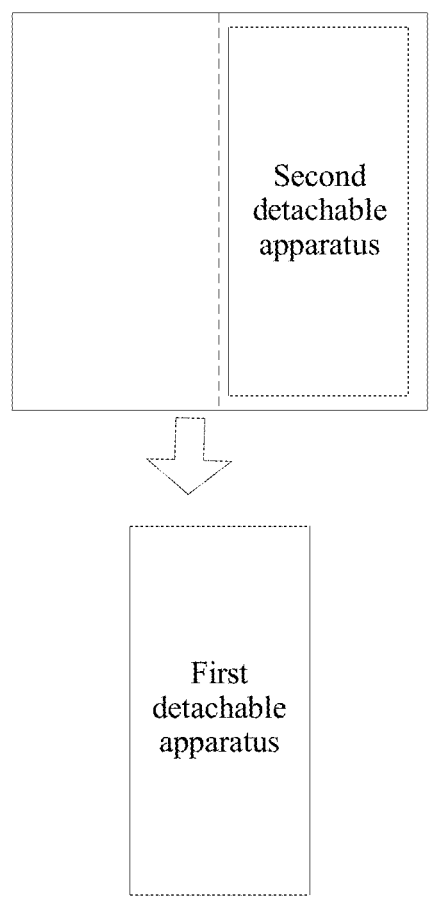
FIG. 18 is a schematic diagram of an electronic device from which a first detachable apparatus has been removed according to an embodiment.
Figure 19:
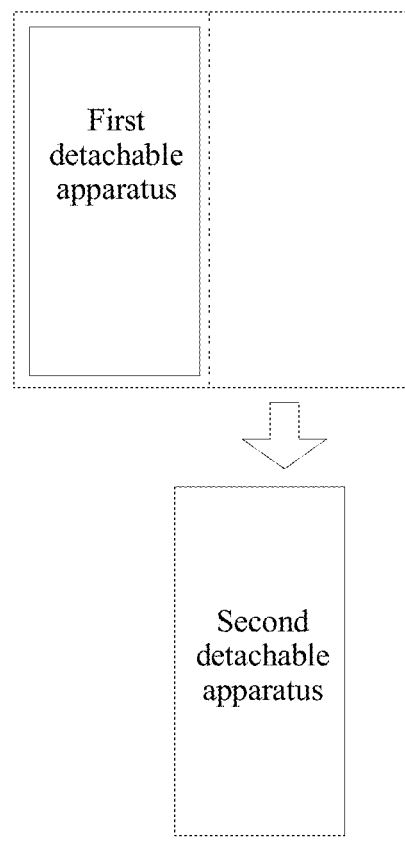
FIG. 19 is a schematic diagram of an electronic device from which a second detachable apparatus has been removed according to an embodiment.

If both the first detachable apparatus and the second detachable apparatus are inserted into the electronic device, there may be three cases when the first detachable apparatus and/or the second detachable apparatus are/is removed from the electronic device. A first case is shown in FIG. 17. FIG. 17 is a schematic diagram of a state obtained after both the first detachable apparatus and the second detachable apparatus are removed from the electronic device. A second case is shown in FIG. 18. FIG. 18 is a schematic diagram of a state obtained after the first detachable apparatus is removed from the electronic device. A third case is shown in FIG. 19. FIG. 19 is a schematic diagram of a state obtained after the second detachable apparatus is removed from the electronic device.

In the foregoing three cases, when determining the to-be-displayed content, the first detachable apparatus considers only the hardware parameter of the first detachable apparatus and does not consider the hardware parameter of the second detachable apparatus. Thus, the first detachable apparatus may run as an independent device.

Figure 20:
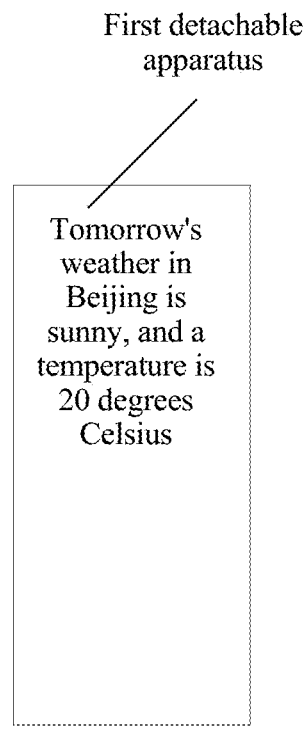
FIG. 20 is a schematic diagram of displaying on a first detachable apparatus after the first detachable apparatus is removed from an electronic device according to an embodiment.
Figure 20A:
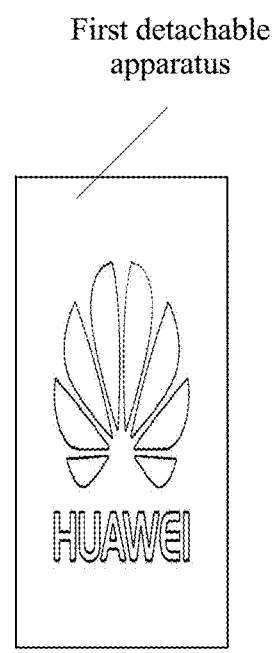
FIG. 20A is a schematic diagram of displaying on a first detachable apparatus after the first detachable apparatus is removed from an electronic device according to an embodiment.

For example, FIG. 20 is a schematic diagram of a possible display on the first detachable apparatus after the first detachable apparatus is removed from the electronic device in a state shown in FIG. 15. When a picture is displayed, FIG. 20A is a schematic diagram of a possible display on the first detachable apparatus after the first detachable apparatus is removed from the electronic device in a state shown in FIG. 16.

In addition, when both the first detachable apparatus and the second detachable apparatus are removed from the electronic device, both the first detachable apparatus and the second detachable apparatus may establish a communication connection to another electronic device. For example, both the first detachable apparatus and the second detachable apparatus are used as Bluetooth headsets. In this case, the first detachable apparatus and the second detachable apparatus may establish a communication connection to a same mobile phone, so that a user may use two Bluetooth headsets at the same time, thereby improving user experience.

In a possible embodiment, a user may set, on a setting interface of the first detachable apparatus or on another electronic device, an enabling manner, a display configuration, a font size, and display duration, and another parameter of the electronic device.

In a possible embodiment, the first detachable apparatus or the second detachable apparatus may be further configured to receive a message sent by the other electronic device. The message sent by the other electronic device is used to indicate that the first detachable apparatus or the second detachable apparatus is a primary control apparatus, and the other electronic device may be controlled by the user. When the message indicates that the first detachable apparatus is a primary control apparatus, the first detachable apparatus may obtain the display content of the first detachable apparatus and the second detachable apparatus when both the first detachable apparatus and the second detachable apparatus are inserted into the electronic device, and send the display content of the second detachable apparatus to the second detachable apparatus. When the message indicates that the second detachable apparatus is a primary control apparatus, the second detachable apparatus may obtain the display content of the first detachable apparatus and the second detachable apparatus when both the first detachable apparatus and the second detachable apparatus are inserted into the electronic device, and send the display content of the first detachable apparatus to the first detachable apparatus. Optionally, whether the first detachable apparatus or the second detachable apparatus is a primary control device may be determined by default before the electronic device is delivered from a factory. It may be understood that when the electronic device has a number of detachable apparatuses, any one or more of the detachable apparatuses may be indicated as a primary control device.

Figure 21A:
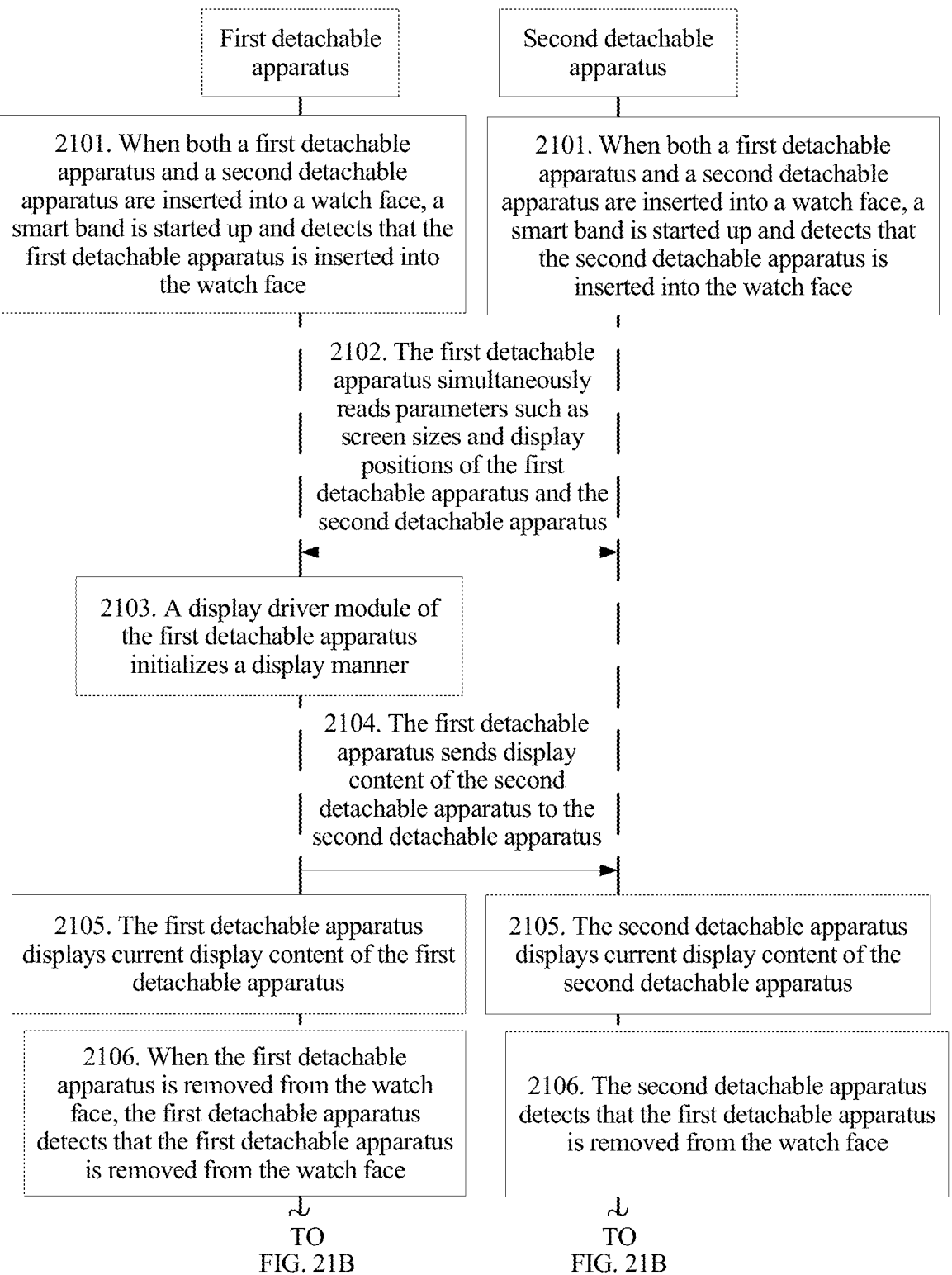
FIG. 21A is a schematic flowchart of inserting a first detachable apparatus into an electronic device and then removing the first detachable apparatus from the electronic device according to an embodiment.
Figure 21B:
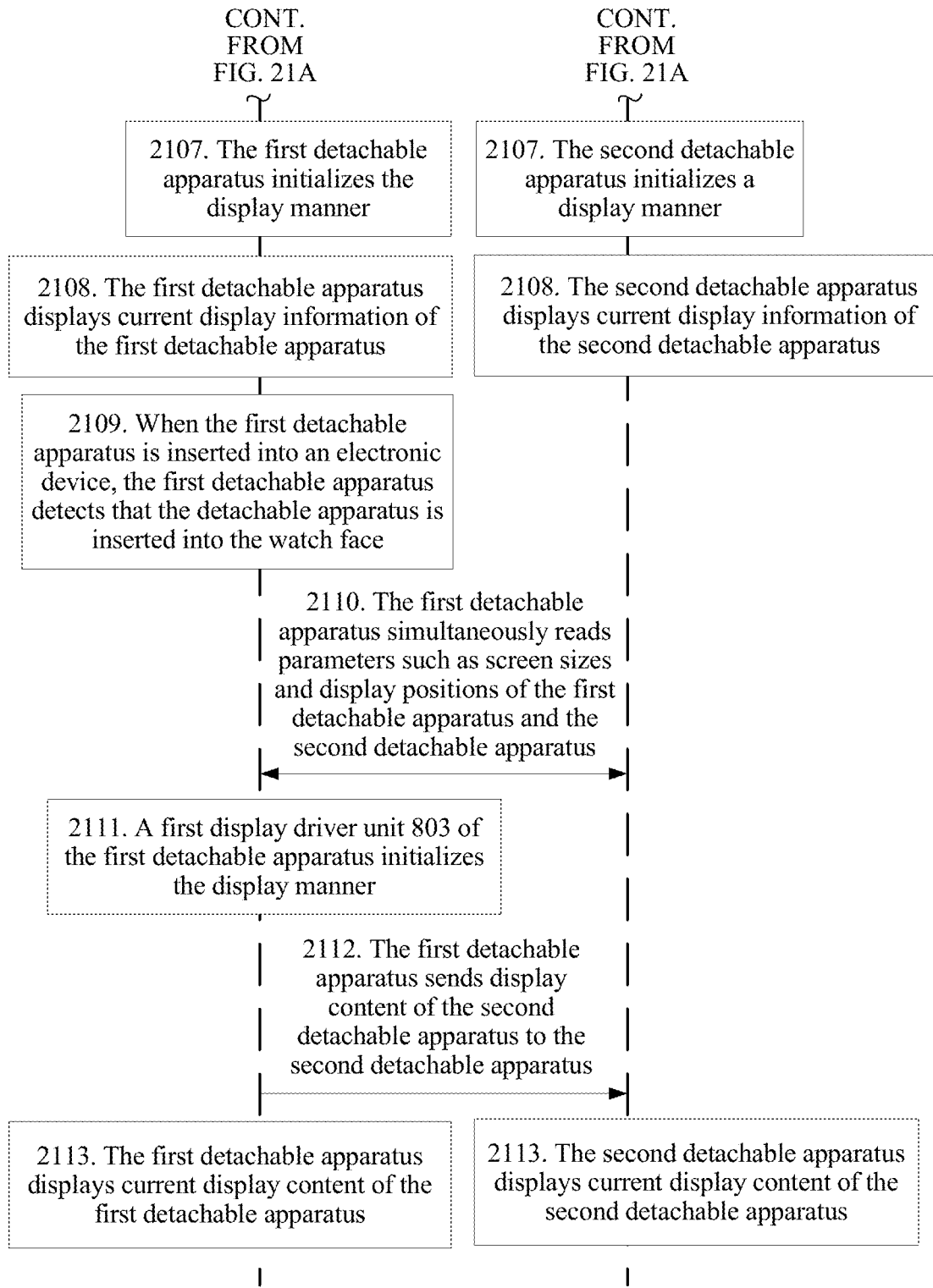
FIG. 21B is a schematic flowchart of inserting a first detachable apparatus into an electronic device and then removing the first detachable apparatus from the electronic device according to an embodiment.

FIG. 21A and FIG. 21B are used below as an example to describe a process in which when a first detachable apparatus is a primary control device, and both the first detachable apparatus and a second detachable apparatus are inserted into a watch face of a smart band, the first detachable apparatus is first removed from and then inserted into the watch face.

In step 2101, when both the first detachable apparatus and the second detachable apparatus are inserted into the watch face, the smart band is started up and detects that both the first detachable apparatus and the second detachable apparatus are inserted into the watch face.

In step 2102, the first detachable apparatus simultaneously reads parameters such as screen sizes and display positions of the first detachable apparatus and the second detachable apparatus.

In step 2103, a first display driver unit 803 of the first detachable apparatus initializes a display configuration.

In step 2104, the first detachable apparatus sends display content of the second detachable apparatus to the second detachable apparatus.

In step 2105, the first detachable apparatus displays current display content of the first detachable apparatus, and at the same time, the second detachable apparatus displays current display content of the second detachable apparatus.

In step 2106, when the first detachable apparatus is removed from the watch face, the first detachable apparatus detects that the first detachable apparatus is removed from the watch face, and at the same time, the second detachable apparatus detects that the first detachable apparatus is removed from the watch face.

In step 2107, the first detachable apparatus initializes a display configuration, and at the same time, the second detachable apparatus initializes a display configuration.

In step 2108, the first detachable apparatus displays current display information of the first detachable apparatus, and at the same time, the second detachable apparatus displays current display information of the second detachable apparatus.

In step 2109, when the first detachable apparatus is inserted into the watch face, the first detachable apparatus detects that the detachable apparatus is inserted into the watch face.

In step 2110, the first detachable apparatus simultaneously reads parameters such as screen sizes and display positions of the first detachable apparatus and the second detachable apparatus.

In step 2111, the first display driver unit 803 of the first detachable apparatus initializes the display configuration.

In step 2112, the first detachable apparatus sends display content of the second detachable apparatus to the second detachable apparatus.

In step 2113, the first detachable apparatus displays current display content of the first detachable apparatus, and at the same time, the second detachable apparatus displays current display content of the second detachable apparatus.

Thus, when both the first detachable apparatus and the second detachable apparatus are inserted into the electronic device, the first detachable apparatus may obtain the display content of the first detachable apparatus and the display content of the second detachable apparatus based on a hardware parameter of the first detachable apparatus and a hardware parameter of the second detachable apparatus, and then send the display content of the second detachable apparatus to the second detachable apparatus and display the display content of the first detachable apparatus. The second detachable apparatus may be configured to receive and display the display content that is of the second detachable apparatus and that is sent by the first detachable apparatus. When the first detachable apparatus and/or the second detachable apparatus are/is removed from the electronic device, the first detachable apparatus may be configured to display to-be-displayed content based on the hardware parameter of the first detachable apparatus, and the second detachable apparatus may be configured to display to-be-displayed content based on the hardware parameter of the second detachable apparatus. In other words, when both the first detachable apparatus and the second detachable apparatus are inserted, screens may jointly display content. In this case, a display screen of the electronic device is the largest; or when the first detachable apparatus and/or the second detachable apparatus are/is removed from the electronic device, screens may separately display content. Therefore, a display effect of the electronic device can be improved.

The solutions provided in the embodiments are mainly described above from a perspective of the detachable apparatus, namely, the first display apparatus. It may be understood that to implement the foregoing functions, the first display apparatus includes corresponding hardware structures and/or software modules for performing the functions. A person of ordinary skill in the art understands that the algorithm steps described with reference to the embodiments may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the embodiments.

Figure 22:
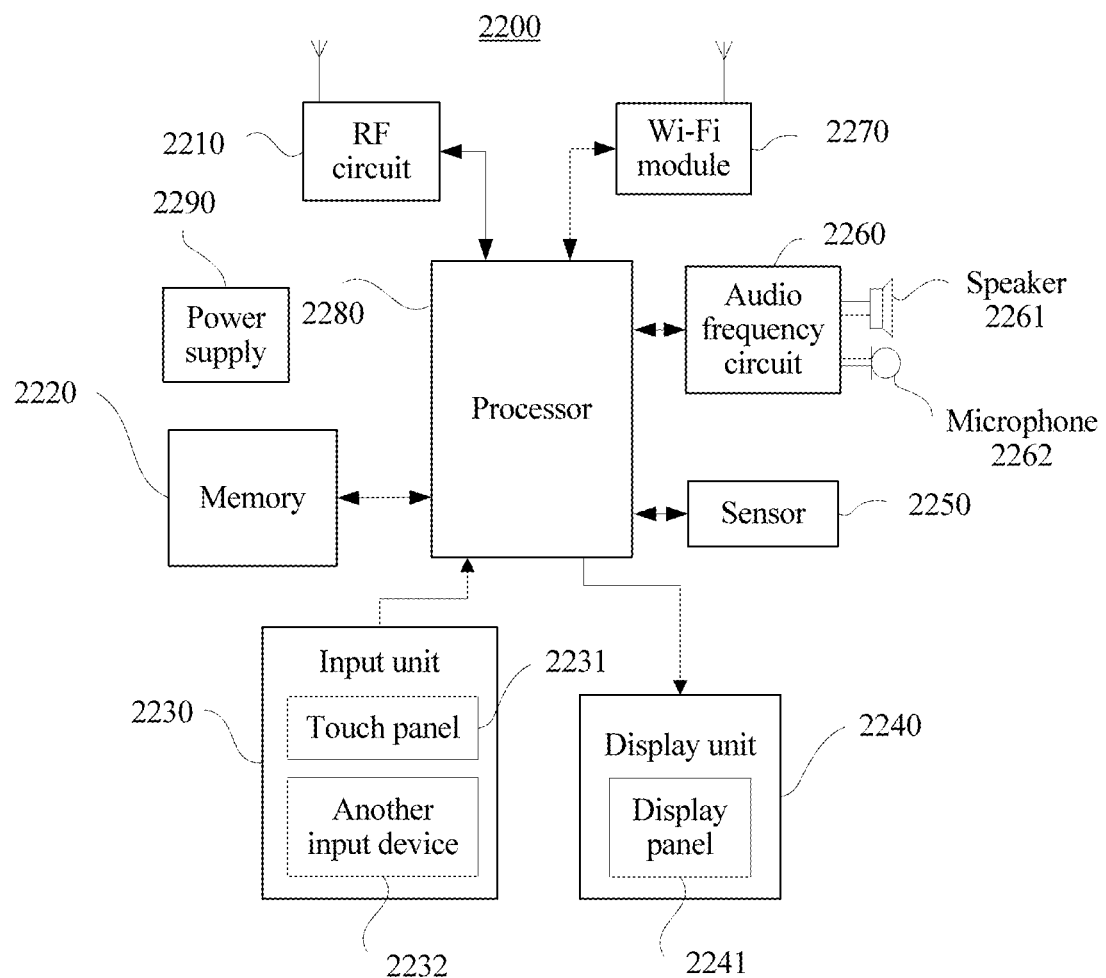
FIG. 22 is a schematic structural diagram of a first display apparatus according to an embodiment.

Another possible embodiment is shown in FIG. 22. FIG. 22 is a schematic diagram of a hardware structure of a first display apparatus of an electronic device.

It should be understood that the first display apparatus 2200 shown in FIG. 22 is merely an example of a first display apparatus, and the first display apparatus 2200 may have more or fewer components than those shown in the figure, or combine two or more components, or have a different component configuration. Various components shown in the figure may be implemented in hardware that includes one or more signal processors and/or application-specific integrated circuits (ASIC), in software, or in a combination of hardware and software.

Referring to FIG. 22, the first display apparatus 2200 includes components such as a radio frequency (RF) circuit 2210, a memory 2220, an input unit 2230, a display unit 2240, a sensor 2250, an audio frequency circuit 2260, a Wi-Fi module 2270, a processor 2280, and a power supply 2290. A person skilled in the art may understand that a structure of the first display apparatus shown in FIG. 22 constitutes no limitation on the first display apparatus, and the first display apparatus may include more or fewer components than those shown in the figure, or combine some components, or have a different component arrangement.

Each constituent component of the first display apparatus 2200 is described below in detail with reference to FIG. 22.

The RF circuit 2210 may be configured to receive and send a signal in an information reception and transmission process or a call process. In particular, after receiving downlink information of a base station, the RF circuit 2210 may send the downlink information to the processor 2280 for processing, and in addition, send related uplink data to the base station. Generally, the RF circuit includes but is not limited to an antenna, at least one amplifier, a transceiver, a coupler, a low noise amplifier (LNA), a duplexer, and the like. In addition, the RF circuit 2210 may further communicate with a network and another device through wireless communication. The wireless communication may use any communications standard or protocol, including but not limited to: the Global System for Mobile Communications (GSM), a general packet radio service (GPRS), Code Division Multiple Access (CDMA), Wideband Code Division Multiple Access (WCDMA), LTE, an e-mail, and a short message service (SMS). The RF circuit 2210 has similar functions as the first network hardware unit 807 that can encode, receive, send, and perform error correction on a network signal in FIG. 8.

The memory 2220 may be configured to store a software program and a software module. The processor 2280 executes various functional applications and data processing of the first display apparatus 2200 by running the software program and the software module that are stored in the memory 2220. The memory 2220 may mainly include a program storage area and a data storage area. The program storage area may store an operating system, an application program required by at least one function (such as a sound playing function or an image playing function), and the like. The data storage area may store data (such as audio data or a phone book) created based on use of the first display apparatus 2200, and the like. In addition, the memory 2220 may include a high-speed random-access memory, and may further include a nonvolatile memory, for example, at least one magnetic disk storage device, a flash storage device, or another volatile solid-state storage device.

The input unit 2230 may be configured to receive entered digital or character information and generate key signal input related to user settings and function control of the first display apparatus 2200. The input unit 2230 may include a touch panel 2231 and another input device 2232. The touch panel 2231, also referred to as a touchscreen, may collect a touch operation performed by a user on or near the touch panel 2231 (for example, an operation performed by the user on or near the touch panel 2231 using any suitable object or accessory such as a finger or a stylus), and may drive a corresponding connection apparatus based on a preset program. Optionally, the touch panel 2231 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and sends the touch point coordinates to the processor 2280, and can receive and execute a command sent by the processor 2280. In addition, the touch panel 2231 may be implemented using a number of types such as a resistive type, a capacitive type, an infrared ray, and a surface acoustic wave. In addition to the touch panel 2231, the input unit 2230 may further include other input devices 2232. The other input device 2232 may include but are not limited to one or more of a physical keyboard, a function key (such as a volume control key or an on/off key), a trackball, a mouse, a joystick, and the like.

The display unit 2240 may be configured to display information entered by the user or information provided for the user, and various menus of the first display apparatus 2200. The display unit 2240 may include a display panel 2241. Optionally, the display panel 2241 may be implemented in a form such as liquid crystal display (LCD) or an organic light-emitting diode (OLED). Further, the touch panel 2231 may cover the display panel 2241. When detecting the touch operation on or near the touch panel 2231, the touch panel 2231 transfers the touch operation to the processor 2280 to determine a type of a touch event, and then the processor 2280 provides corresponding visual output on the display panel 2241 based on the type of the touch event. In FIG. 22, the touch panel 2231 and the display panel 2241 are used as two independent components to implement input and input functions of the first display apparatus 2200. However, in some embodiments, the touch panel 2231 and the display panel 2241 may be integrated to implement the input and output functions of the first display apparatus 2200. The display unit 2240 has similar functions as the first display interface unit 802, the first display driver unit 803, and the first display unit 804 that implement content displaying in FIG. 8.

The first display apparatus 2200 may further include at least one sensor 2250, for example, a light sensor, a motion sensor, and another sensor. The light sensor may include an ambient light sensor and a proximity sensor. The ambient light sensor may adjust luminance of the display panel 2241 based on brightness of ambient light, and the proximity sensor may turn off the display panel 2241 and/or backlight when the first display apparatus 2200 moves to an ear. As a motion sensor, an accelerometer sensor may detect accelerations in all directions (three axes generally), may detect a magnitude and a direction of gravity at rest, and may be applied to an application that recognizes a first display apparatus posture (such as screen switching between portrait and landscape modes, a related game, and magnetometer posture calibration), a function related to vibration recognition (such as a pedometer or a knock), and the like. For other sensors such as a gyroscope, a barometer, a hygrometer, a thermometer, and an infrared sensor that can also be configured on the first display apparatus 2200, details are not described herein. The sensor 2250 has a similar function as the first detection unit 808 in FIG. 8 that is configured to detect that the first display apparatus is removed from or inserted into the electronic device.

The audio frequency circuit 2260, a speaker 2261, and a microphone 2262 may provide audio interfaces between the user and the first display apparatus 2200. The audio frequency circuit 2260 may transmit, to the speaker 2261, a received electrical signal obtained after audio data conversion, and the speaker 2261 converts the electrical signal to a sound signal for output. In addition, the microphone 2262 converts a collected sound signal to an electrical signal, and the audio frequency circuit 2260 receives the electrical signal, converts the electrical signal to audio data, and outputs the audio data to the RF circuit 2208, to send the audio data to, for example, another display apparatus, or outputs the audio data to the memory 2220 for further processing.

Wi-Fi is a short-range wireless transmission technology. The first display apparatus 2200 may help, using the Wi-Fi module 2270, the user receive and send emails, browse a web page, access streaming media, and the like. The Wi-Fi module 2270 provides the user with wireless broadband Internet access. Although the Wi-Fi module 2270 is shown in FIG. 22, it may be understood that the Wi-Fi module 2270 is not essential to the first display apparatus 2200, and may be omitted as required without changing the essence of the embodiments. In addition, the Wi-Fi module 2270 has some similar functions as the first network hardware unit 807 in FIG. 8.

The processor 2280 is a control center of the first display apparatus 2200 and uses various interfaces and lines to connect parts of the entire first display apparatus. By running or executing the software program and/or the software module stored in the memory 2220 and invoking data stored in the memory 2220, the processor 2280 implements various functions of the first display apparatus 2200 and processes data, to perform overall monitoring on the first display apparatus. Optionally, the processor 2280 may include one or more processing units. Optionally, an application processor and a modem processor may be integrated into the processor 2280. The application processor mainly processes an operating system, a user interface, an application program, and the like, and the modem processor mainly processes wireless communication. It may be understood that the modem processor may alternatively be not integrated into the processor 2280.

The first display apparatus 2200 further includes the power supply 2290 (such as a battery) that supplies power to each component. Optionally, the power supply may be logically connected to the processor 2280 using a power supply management system, to implement functions such as charging management, discharging management, and power consumption management using the power supply management system.

Although not shown, the first display apparatus 2200 may also include a camera, a Bluetooth module, and the like, and details are not described herein.

In this embodiment, the sensor 2250 may be configured to detect whether the first display apparatus is disposed on the electronic device.

The processor 2280 is configured to control a display configuration of the first display apparatus. The first display apparatus and a second display apparatus jointly display first display content if the first display apparatus is disposed on the electronic device. The first display apparatus displays second display content if the first display apparatus is not disposed on the electronic device, where the second display content is related to first display content. It may be understood that the processor 2280 determines, using the sensor 2250, whether the first display apparatus is disposed on the electronic device. The processor 2280 uses the display unit 2240 and a display unit 2340 of the second display apparatus to jointly display the first display content, or displays the second display content using the display unit 2240.

The display unit 2240 may be configured to jointly display the first display content with the display unit 2340 of the second display apparatus, or configured to display the second display content.

The RF circuit 2210 is configured to: receive a first setting message sent by the user using another electronic device, where the first setting message indicates that the first display apparatus is a primary control apparatus and the second display apparatus is a secondary apparatus; or receive a second setting message sent by the user using another electronic device, where the second setting message indicates that the first display apparatus is a secondary apparatus. It may be understood that the RF circuit 2210 may process the received first setting message or the received second setting message using the processor 2280.

The memory 2220 may be configured to store the first display content and/or the second display content and/or third display content.

The input unit 2230 may be configured to: receive a first operation instruction entered by the user, where the first operation instruction indicates that a first display module is a primary control module and a second display module is a secondary module; or receive a second operation instruction entered by the user, where the second operation instruction indicates that a first display module is a secondary module and a second display module is a primary control module.

In addition, the processor 2280 may correspond to the first application unit 801, the first display interface unit 802, the first display driver unit 803, the first network interface unit 805, the first network driver unit 806, and the first network hardware unit 807 in FIG. 8. The first display 2240 may be corresponding to the first display unit 804 in FIG. 8. The RF circuit 2210 may be corresponding to the first communications unit 809 in FIG. 8.

It may be understood that the first display apparatus shown in FIG. 22 may be configured to perform method steps related to the first display apparatus in FIG. 11, FIG. 13A and FIG. 13B, FIG. 14A and FIG. 14B, and FIG. 21A and FIG. 21B. For exemplary implementation details of performing the method, refer to related descriptions in FIG. 11, FIG. 13A and FIG. 13B, FIG. 14A and FIG. 14B, and FIG. 21A and FIG. 21B. No enumeration is provided herein. All features and technical effects in FIG. 11, FIG. 13A and FIG. 13B, FIG. 14A and FIG. 14B, and FIG. 21A and FIG. 21B are applicable to the first display apparatus 2200.

In a possible embodiment, the second display apparatus included in the electronic device may have a hardware structure similar to that of the first display apparatus or may have components more or fewer than those shown in FIG. 22.

For example, the second display apparatus may have a Wi-Fi module, so that after the first display apparatus is removed from the electronic device, the second display apparatus may communicate with the first display apparatus using the Wi-Fi module. The second display apparatus may have a processor configured to control a display configuration of the second display apparatus. The first display apparatus and the second display apparatus jointly display the first display content if the first display apparatus is disposed on the electronic device. The second display apparatus displays the third display content if the first display apparatus is not disposed on the electronic device, where the third display content is preset display content or is related to the first display content. In a possible embodiment, the processor of the second display apparatus may be a coprocessor that cooperates with the processor of the first display apparatus to jointly display the first display content. In a possible embodiment, the second display apparatus may include no processor, and the processor of the first display apparatus may control a display configuration of the second display apparatus. The second display apparatus may include all of a temperature sensor, a humidity sensor, a voltage sensor, and a current sensor, so that after the first display apparatus is removed from the electronic device, the second display apparatus may measure a temperature using the temperature sensor, measure ambient humidity using the humidity sensor, and the like. The second display apparatus may have no audio frequency circuit, and after the first display apparatus is inserted into the electronic device, the electronic device may output audio using the audio frequency circuit of the first display apparatus.

It may be understood that the second display apparatus may be configured to perform method steps related to the second display apparatus in FIG. 11, FIG. 13A and FIG. 13B, FIG. 14A and FIG. 14B, and FIG. 21A and FIG. 21B. For exemplary implementation details of performing the method, refer to related descriptions in FIG. 11, FIG. 13A and FIG. 13B, FIG. 14A and FIG. 14B, and FIG. 21A and FIG. 21B. No enumeration is provided herein. All features and technical effects in FIG. 11, FIG. 13A and FIG. 13B, FIG. 14A and FIG. 14B, and FIG. 21A and FIG. 21B are applicable to the second display apparatus.

The methods or algorithm steps described with reference to the content disclosed herein may be implemented in a hardware manner, or may be implemented in a manner of executing a software instruction by a processor. The software instruction may be executed by a corresponding software module. The software module may be stored in a RAM, a flash memory, a ROM, an EPROM, an EEPROM, a register, a hard disk, a removable hard disk, a read-only optical disc, or a storage medium of any other form known in the art. A storage medium used as an example is coupled to the processor, so that the processor can read information from the storage medium and can write information into the storage medium. The storage medium may be a part of the processor. The processor and the storage medium may be located in an ASIC. In addition, the ASIC may be located in a core network interface device. The processor and the storage medium may exist in the core network interface device as discrete components.

A person of skill in the art should understand that in one or more of the foregoing examples, the functions described herein may be implemented using hardware, software, firmware, or any combination thereof. When an embodiment is implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

In the foregoing exemplary implementations, the objective, technical solutions, and benefits are further described in detail. It should be understood that the foregoing descriptions are merely exemplary implementations of the embodiments, but are not intended to limit the protection scope. Any modification, equivalent replacement, or improvement made based on the technical solutions shall fall within the protection scope.

What is claimed is:

1. A display method, applied to an electronic device, wherein the electronic device comprises a first display unit and a second display unit, the method comprising a first operating mode and a second operating mode:
    in the first operating mode,
        jointly displaying, by the first display unit and the second display unit, first display content if the first display unit is attached to the electronic device;
        displaying, by the first display unit, part of the first display content, and sending a remaining part of the first display content to the second display unit so that the second display unit displays the remaining part of the first display content;
    and, in the second operating mode,
        separately displaying, by the first display unit and the second display unit, second and third display content if the first display unit is not disposed on the electronic device, wherein the first display unit displays the second display content, the second display content is related to the first display content, and the second display unit displays the third display content,
    wherein the first display unit is detachable from the electronic device while the second display unit is fixedly attached at the electronic device,
        wherein when the second display content is related to the first display content, the second display content comprises all or a part of the first display content, and when the second display content comprises all of the first display content, the second display content comprises all display objects in the first display content.

2. The method according to claim 1, further comprising:
    receiving, by the electronic device, a first operation instruction entered by a user, wherein the first operation instruction indicates that the first display unit is a primary control unit and the second display unit is a secondary unit; or
    receiving a second operation instruction entered by a user, wherein the second operation instruction indicates that the first display unit is a secondary unit and the second display unit is a primary control unit.

3. The method according to claim 2, wherein the electronic device is connected to a second electronic device, and the method further comprises:
receiving, by the electronic device, a first setting message sent by the user by using the second electronic device, wherein the first setting message indicates that the first display unit is a primary control unit and the second display unit is a secondary unit; or
receiving a second setting message sent by the user by using the second electronic device, wherein the second setting message indicates that the first display unit is a secondary unit.

4. The method according to claim 3, wherein the first display unit is a primary control unit, and the method further comprises:
the second display unit cannot communicate with the electronic device if the first display unit is not disposed on the electronic device.

5. The method according to claim 1, wherein the first display unit comprises different hardware from that of the second display unit.

6. The method according to claim 1, wherein the second display unit is a non-detachable unit, the electronic device further comprises a third display unit, and the method comprises:
jointly displaying content, by the first display unit, the second display unit, and the third display unit, if the first display unit and the third display unit are disposed on the electronic device; or
separately displaying content, by the first display unit, the second display unit, and the third display unit, if the first display unit or the third display unit is not disposed on the electronic device.

7. The method according to claim 1, further comprising:
the first display unit is capable of charging the second display unit, or the second display unit is capable of charging the first display unit.

8. An electronic device, wherein the electronic device comprises a first display module and a second display module, the first display module and the second display module are configured to be operated in a first operating mode and a second operating mode; and
in the first operating mode, the first display module and the second display module jointly display first display content if the first display module is disposed on the electronic device, and the first display module comprises a first display unit, and the first display unit is configured to:
display partial content of the first display content; and
the first display module further comprises a first communications unit, and the first communications unit is configured to send remaining content of the first display content to the second display module, so that the second display module displays the remaining content of the first display content;
and, in the second operating mode, the first display module and the second display module separately perform displaying if the first display module is not disposed on the electronic device, wherein the first display module displays second display content, the second display content is related to the first display content, and the second display module displays third display content,
wherein the first display module is detachable from the electronic device while the second display module is fixedly attached at the electronic device,
wherein when the second display content is related to the first display content, the second display content comprises all or a part of the first display content, and when the second display content comprises all of the first display content, the second display content comprises all display objects in the first display content.

9. The electronic device according to claim 8, wherein the first display module further comprises a first input/output unit, and the first input/output unit is configured to:
receive a first operation instruction entered by a user, wherein the first operation instruction indicates that the first display module is a primary control module and the second display module is a secondary module; or
receive a second operation instruction entered by a user, wherein the second operation instruction indicates that the first display module is a secondary module and the second display module is a primary control module.

10. The electronic device according to claim 8, wherein the electronic device is connected to a second electronic device, and the first communications unit is further configured to:
receive a first setting message sent by the user by using the second electronic device, wherein the first setting message indicates that the first display module is a primary control module and the second display module is a secondary module; or
receive a second setting message sent by the user by using the second electronic device, wherein the second setting message indicates that the first display module is a secondary module.

11. The electronic device according to claim 10, wherein the second display module cannot communicate with the electronic device if the first display module is not disposed on the electronic device.

12. The electronic device according to claim 8, wherein a material of the first display module is different from that of the second display module.

13. The electronic device according to claim 8, wherein the second display module is a non-detachable module, and the electronic device further comprises a third display module; and
the first display module, the second display module, and the third display module jointly perform displaying if the first display module and the third display module are disposed on the electronic device; or
the first display module, the second display module, and the third display module separately perform displaying if the first display module or the third display module is not disposed on the electronic device.

14. The electronic device according to claim 8, wherein the first display module is capable of charging the second display module, or the second display module is capable of charging the first display module.

* * * * *